(12) United States Patent
Jin et al.

(10) Patent No.: US 10,782,889 B2
(45) Date of Patent: Sep. 22, 2020

(54) FIBRE CHANNEL SCALE-OUT WITH PHYSICAL PATH DISCOVERY AND VOLUME MOVE

(71) Applicant: HEWLETT PACKARD ENTERPRISE DEVELOPMENT LP, Houston, TX (US)

(72) Inventors: Tao Jin, Durham, NC (US); Jason M. Fox, Cary, NC (US); Naveen Bali, Chapel Hill, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 527 days.

(21) Appl. No.: 15/151,436

(22) Filed: May 10, 2016

(65) Prior Publication Data

US 2017/0329714 A1    Nov. 16, 2017

(51) Int. Cl.
| | | |
|---|---|---|
| G06F 12/00 | (2006.01) | |
| G06F 13/00 | (2006.01) | |
| G06F 13/28 | (2006.01) | |
| G06F 3/06 | (2006.01) | |
| G06F 12/0868 | (2016.01) | |
| G06F 9/30 | (2018.01) | |

(52) U.S. Cl.
CPC ............ *G06F 3/0617* (2013.01); *G06F 3/067* (2013.01); *G06F 3/0635* (2013.01); *G06F 9/30141* (2013.01); *G06F 12/0868* (2013.01)

(58) Field of Classification Search
CPC ......................... G06F 9/30141; G06F 12/0868
USPC ........................................................ 711/119
See application file for complete search history.

(56) References Cited

U.S. PATENT DOCUMENTS

| 5,862,338 | A | * | 1/1999 | Walker | .................. | H04L 49/351 |
|---|---|---|---|---|---|---|
| | | | | | | 709/224 |
| 2003/0221063 | A1 | * | 11/2003 | Eguchi | .................. | G06F 3/0605 |
| | | | | | | 711/114 |
| 2006/0095695 | A1 | * | 5/2006 | Daniels | ............... | G06F 11/1435 |
| | | | | | | 711/162 |
| 2006/0195704 | A1 | * | 8/2006 | Cochran | ............. | G06F 11/1666 |
| | | | | | | 713/193 |

(Continued)

*Primary Examiner* — Edward J Dudek, Jr.
*Assistant Examiner* — Sydney Li
(74) *Attorney, Agent, or Firm* — Hewlett Packard Enterprise Patent Department

(57) ABSTRACT

Methods, storage arrays and computer readable media for path discovery to ports of a Fibre Channel storage system that includes a multi-array pool and is part of a group of arrays are provided. One example method includes executing a pull operation via a group leader array of the group of arrays. The pull operation is configured to gather port status of each one of the arrays in the group of arrays. The method further executes a push operation via the group leader array of the group of arrays. The push operation is configured to populate a local cache of each array in the group of arrays with the port status of each one of the arrays in the group of arrays. The method executes the pull operation and the push operation on a periodic schedule, such that changes that occur at particular ones of the arrays of the group of arrays are pushed to each one of the arrays in the group of arrays. Configurations for enabling volume moves, striping data across arrays and pools, pool creation, pool deletes, pool adds, group merge and other processes are also provided.

27 Claims, 13 Drawing Sheets

(56) References Cited

U.S. PATENT DOCUMENTS

| | | | | |
|---|---|---|---|---|
| 2007/0079068 A1* | 4/2007 | Draggon | ............... | G06F 3/0608 |
| | | | | 711/114 |
| 2016/0006810 A1* | 1/2016 | Chiba | ..................... | G06F 13/14 |
| | | | | 709/219 |

* cited by examiner

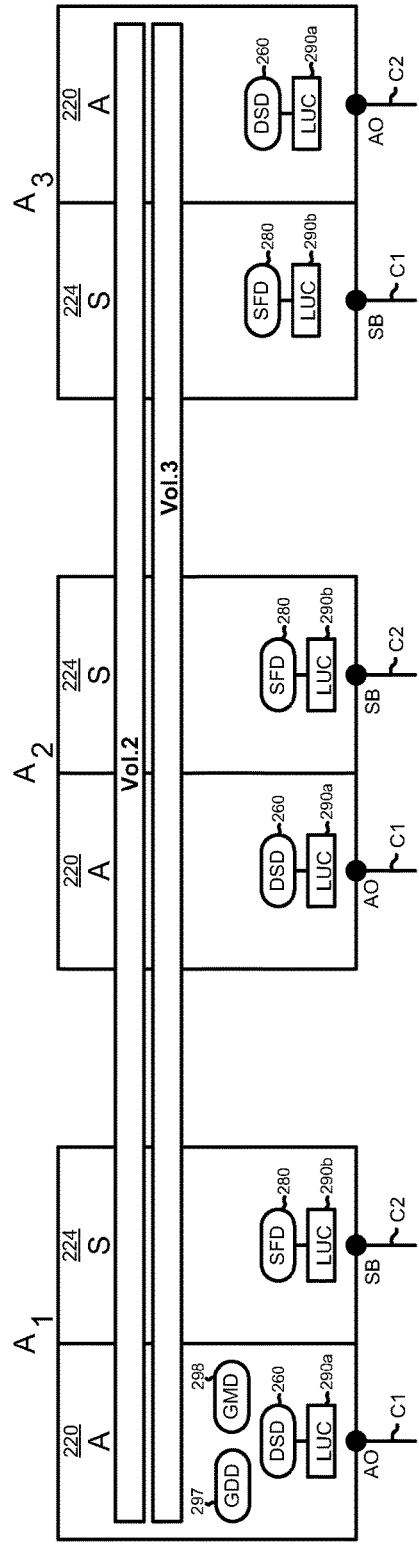

FIBRE CHANNEL SCALE-OUT WITH PHYSICAL PATH DISCOVERY AND VOLUME MOVE

FIELD OF THE EMBODIMENTS

The present disclosure provides methods, storage arrays and computer readable media for scale-out implementations that enable path discovery and volume move operations.

BACKGROUND

Storage arrays are used to store data. Commonly, storage arrays have at least one controller for managing access to storage media of the storage array. The storage media of a storage array may include one or more hard disk drives (HDDs) and/or one or more solid state drives (SSDs). Storage arrays are typically configured with connections to servers via one or more switches to enable efficient and reliable access between the servers and storage arrays. The switches and/or other interconnecting network infrastructure is sometimes referred to as the "fabric." There are various types of fabric protocols. One commonly used fabric protocol is the Fibre Channel protocol. In a Fibre Channel protocol, the storage array operates as a Fibre Channel target, which interconnects via one or more fabrics to one or more initiators, e.g., Fibre Channel configured servers connected to one or more fabrics and/or one or more storage arrays. Often, storage arrays may have two controllers for redundancy, and each of the controllers may have one or more Fibre Channel (FC) adapter cards.

In some configurations, Fibre Channel array configurations require maintaining consistency of which paths are available to specific data stored in the arrays, such as when multiple arrays are defined as part of a group. If a host that communicates with the storage array configuration communicates with a specific storage array that returns wrong port information associated with other arrays that are part of the group, the host will be prevented from accessing the data. In other embodiments, the host may attempt to communicate with the array group several times until giving up or setting an error flag. Discovering paths to a storage array configuration that is defined by multiple arrays of a group requires additional processing to maintain consistency and share information among the arrays in the group to avoid delivering incorrect information to requesting hosts. Furthermore, when arrays are placed in a group, data management is required to identify where specific volume data is stored in the arrays. If this information is not consistently maintained, accessing volumes of a group can introduce errors or access request that are not serviced by the storage array group.

It is in this context that embodiments claimed herein arise.

SUMMARY

Methods, systems, storage arrays, and computer readable media are provided for maintaining consistency of information related to available ports of multiple arrays that are part of a group of arrays. Further embodiments are provided that enable management of pools of arrays that may be made part of a group. Functionality is further provided to enable volume moves. Moving volumes can include, by way of example, moving a volume that is in one pool to another pool within the same group. Movement of volumes is managed in a way that maintains consistency of information regarding the data being moved for the volume or volumes that are moved, added, deleted, or modified. Further embodiments illustrate examples of multi-array pools, which enable striping of volume data across the arrays of the pool. Management of a bin map further enables tracking of data associated with volumes, as the volume is distributed across two or more arrays. These and other embodiments will be described with reference to the figures, and the following description.

In one embodiment, a method for path discovery to ports of a Fibre Channel storage system that includes a multi-array pool and is part of a group of arrays is provided. The method includes executing a pull operation via a group leader array of the group of arrays. The pull operation is configured to gather port status of each one of the arrays in the group of arrays. The method further executes a push operation via the group leader array of the group of arrays. The push operation is configured to populate a local cache of each array's port status in the group of arrays. The method executes the pull operation and the push operation on a periodic schedule, such that changes that occur at particular ones of the arrays of the group of arrays are pushed to each one of the arrays in the group of arrays.

In some embodiments, the port status includes ALUA settings of each port of each array, such that a setting of active optimized (AO) and standby (SB) are determined for each port of the arrays in the group of arrays.

In some embodiments, the periodic schedule is programmable and defined by a time-out window that continually cycles.

In some embodiments, the local cache is a logical unit cache (LUC) that stores logical unit number (LUN) mappings and port data, and is local to each of an active controller and a standby controller of each array in the group of arrays.

In some embodiments, the method further includes striping a volume across at least two arrays of the multi-array pool and maintaining a bin map of that identifies data of the volume stored in each of the at least two arrays. At least two paths to the volume are defined using the port status that identifies ports in the AO ports and the bin map.

In some embodiments, the method further includes identifying a volume in the multi-array pool and executing a move operation of the volume to another pool of arrays of the group of arrays. The method further includes transferring the local cache of one array of the multi-array pool to a local cache of one or more arrays of the other pool. The multi-array pool is a source pool and the other pool being a destination pool. Bin migration is processed, for a bin map, which identifies what data of the volume is stored in each array in the group of arrays.

In some embodiments, the local cache is a logical unit cache (LUC) that stores logical unit number (LUN) mappings and port data, and is local to each of an active controller and a standby controller of each array in the group of arrays.

In some embodiments, after the move operation of the volume is complete, the bin map is updated consistent with a location of data in the array or arrays of the destination pool.

In some embodiments, after the move operation of the volume is complete, paths to the volume in the source pool are removed and paths to the volume in the destination pool are added.

In some embodiments, the method further includes adding an array to the group of arrays. The added array is associated to the multi-array pool or associated a new pool of the group of arrays, and the added array provides for a scale-out of the group of arrays.

In one embodiment, a method for processing a volume move from a source pool to a destination pool of a group of arrays in a Fibre Channel storage system is disclosed. The method includes identifying a volume to be moved and causing a transfer of contents of a local cache of one or more arrays in the source pool to a local cache of one or more arrays of the destination pool. The local cache transferred to the array of the destination pool includes metadata that is descriptive of the volume to be moved. The method then initiates a transfer of data for the volume from the array in the source pool to the array of the destination pool and executed a bin migration process to update a bin map while the transfer of data is in progress, such that when the transfer of data is complete the bin map identifies a location of the data in the destination pool. The method further updates one or more paths to the volume based on port status of ports of the arrays in the group of arrays.

In one embodiment, the port status is maintained current by managing a process that includes executing a pull operation via a group leader array of the group of arrays. The pull operation is configured to gather port status of each one of the arrays in the group of arrays. Then, executing a push operation via the group leader array of the group of arrays. The push operation is configured to populate local cache of each array in the group of arrays with the port status of each one of the arrays in the group of arrays. The method further includes executing the pull operation and the push operation on a repeating schedule, such that a change occurring at particular ones of the arrays of the group of arrays is pushed to each one of the arrays in the group of arrays.

In one embodiment, a storage array arrangement is defined from a group of arrays. The arrays in the group of arrays each have an active controller and a standby controller, wherein a volume move process is executed by a group leader array of the group of arrays. The volume move process is configured to move the volume from a source pool to a destination pool of the group of arrays. The group leader array includes logic for transferring a local cache of one array in the source pool to a local cache of an array of the destination pool. The local cache transferred to the array of the destination pool includes metadata that is descriptive of the volume to be moved. Logic for initiating a transfer of data for the volume from the array in the source pool to the array of the destination pool is further provided, as is logic for executing a bin migration process to update a bin map while the transfer of data is in progress. In this manner, when the transfer of data is complete the bin map identifies a location of the data in the destination pool. Also included is logic for updating one or more paths to the volume based on port status of ports of the arrays in the group of arrays. In one example, logic may be processed so that one or more arrays notify host(s) of changes in one or more paths to the volume, which will then trigger the host(s) to rediscover the paths.

In yet another embodiment, computer readable media having programming instructions for processing a volume move from a source pool to a destination pool of a group of arrays in a Fibre Channel storage system, is provided. The computer readable media includes program instructions for identifying a volume to be moved and program instructions for transferring a local cache of one array in the source pool to a local cache of an array of the destination pool. The local cache transferred to the array of the destination pool includes metadata that is descriptive of the volume to be moved. Program instructions for initiating a transfer of data for the volume from the array in the source pool to the array of the destination pool, and program instructions for executing a bin migration process to update a bin map while the transfer of data is in progress are also provided. In this embodiment, when the transfer of data is complete the bin map identifies a location of the data in the destination pool. Further provided are program instructions for updating one or more paths to the volume based on port status of ports of the arrays in the group of arrays. In one example, logic may be processed so that one or more arrays notify host(s) of changes in one or more paths to the volume, which will then trigger the host(s) to rediscover the paths.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

FIG. 5 illustrates an example of three arrays A1, A2 and A3, having volumes striped across the various arrays.

FIG. 6 illustrates an example of a bin map that keeps track of the distribution of bins associated with the volumes stored on arrays A1-A3 of FIG. 5.

FIG. 7A illustrates a table for report target port groups (RTPG) data, which is collected and maintained accurately using a management function, in accordance with one embodiment.

DETAILED DESCRIPTION

Figure 1A:
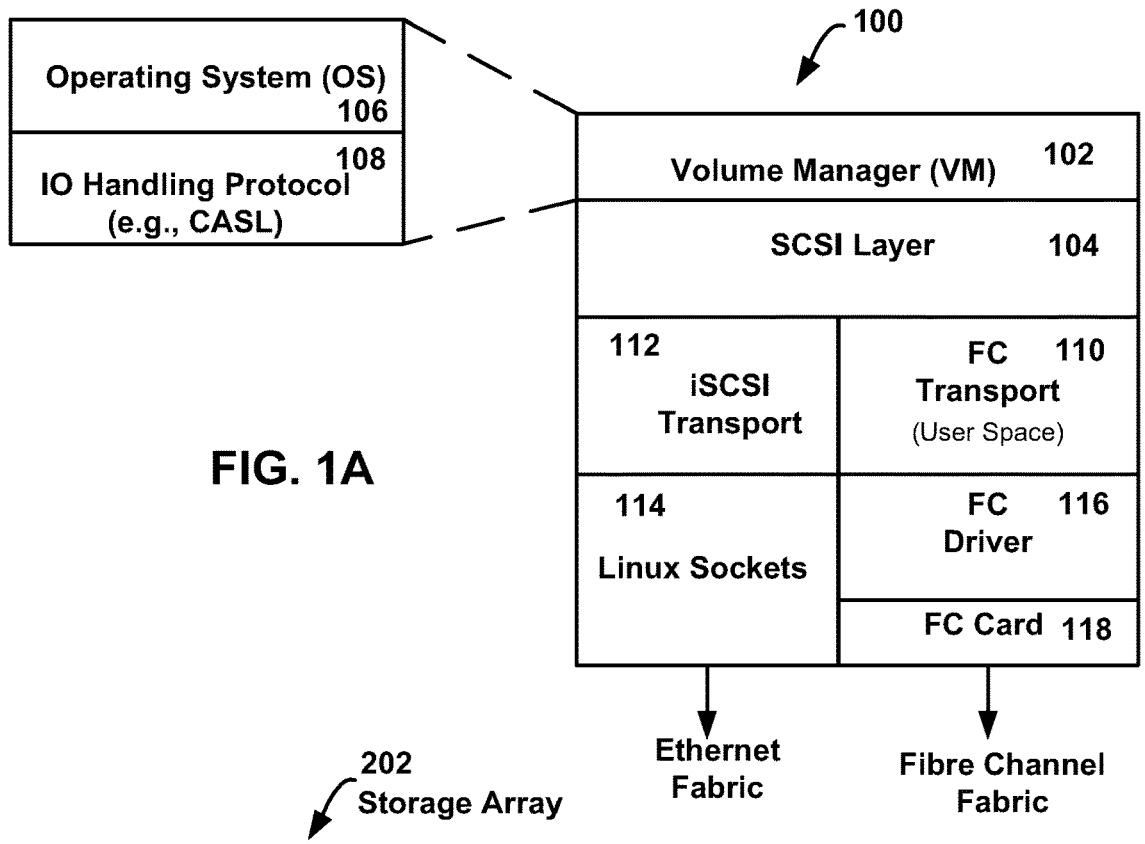
FIG. 1A illustrates one example view of a storage array SCSI target stack in accordance with one embodiment.

The following embodiments describe methods, devices, systems, and computer programs for enabling scale-out operations for storage arrays, and enabling multi-array pools that include striping of volumes across arrays. The embodiments described herein further define methods and systems that enable consistency of port status known to each array in a group, and further enable volume move operations, pool creation, pool delete, assignment of pools to existing groups, un-assigning of pools from groups, merging groups, and other storage management functions implemented in Fibre Channel storage configurations.

In one embodiment, a volume is pool scoped, and because of various pool operations, an array may be added into or removed from the pool. This function will enable or disable hosts to access volumes through SCSI ITNs between hosts and the affected array. Embodiments described herein also ensure that correct LU inventory information is reported on all relevant SCSI ITNs, as well as correct SCSI ALUA path information is reported for each SCSI LU. The LU cache is used to supply LU map and target portal group map to SCSI. SCSI runs with both a DSD process and an SFD process, as will be described below. On each array, LU cache is available on both active controller (shared by DSD and SFD) and standby controller (used by SDF).

In various embodiments described herein, method and systems are disclosed to enable active discovery of ports available to each array in a group. One method uses a GDD management function to interrogate all DSD processes running on each array of the group to determine the ALUA state of each port (i.e., AO and SB). In addition, if a volume is striped across multiple arrays, a multi-pathing layer is provided with information as to which array holds which bins of data, which are striped across the arrays. The data pulled from the interrogation is pushed back to the LU cache of each array. When a host sends a command to one of the arrays, e.g., a Report Target Port Group (RTPG), the DSD of the array looks to its LU cache and reports back the paths and ALUA state. No matter which array responds to the RTPG, the answer is consistent since the LU cache is maintained current regarding the state of all arrays.

In another embodiment, a management daemon (GMD) process is configured to process adds of volumes to arrays and pools, including management of striping operations. By way of example, the GMD process is configured to communicate with a DSD of one of the arrays of a target pool, and instructs the DSD to send data to the array being added. DSD sends volume metadata and other LU cache information regarding the group to DSD of array that is being added. In one embodiment, the LU cache of the array that is going to be added receives and stores the metadata. Further, bins are rearranged across arrays, based on which data of a volume is stored in specific arrays. If the added array is going to receive data from a volume being striped across existing arrays and the newly added array, a bin map maintains information regarding which data blocks of the volume are stored in which array.

In still other embodiments, the GMD process is configured to execute moves of volumes from one array to another array in the group. The move may be from one pool of the group to another pool in the group. By way of example, the GMD process is configured to instruct a DSD of a source pool currently having the volume to communicate volume metadata to a destination pool array, such that a DSD of the destination pool array can update its LU cache regarding the volume to be moved. The GMD process than instructs movement of the volume data to the destination pool, while instructing bin migration to maintain tracking of which bins have been moved consistent with the data that has been moved from the source array to the destination array.

In an additional embodiment, an FC connection pre-check can be performed to determine if an array to be added is available, from the standpoint of physical connections, networking paths, and/or zones. This pre-check can be performed first, before a volume move is allowed to proceed. In this manner, the volume is not moved to an array that is not network accessible.

As will be appreciated by those skilled in the art, the management functions performed by the storage arrays enable for efficient operations for creation of pools, deletion of pools, assignment of pools to specific groups, an assignment of pools from specific groups, merging of groups that have already been initiated and running, moves of volumes between pools, striping of data across multiple arrays, adding arrays to existing pools and expanding the striping across the existing and added arrays, and operations for non-disruptive volume moves between pools in a group. The non-disruptive processes for moving volumes will be discussed in greater detail below, but generally a move of a volume owned by one pool is processed by a management function of the group. Once the move operation has been started and is completed, hosts need to discover new paths to the volume that is being moved or has been moved. By updating the hosts regarding moved volumes, a cut over process is facilitated so that the volume path from the source pool is cut and the path to the destination pool is activated. By way of example, a host can send a report target port groups (RTPG) command to anyone of the arrays in the group, and the response by the array that received the command can provide a consistent response of the specific ports of the arrays and their ALUA status. In this manner, hosts are able to access specific volumes of the group, without failure even after volume moves are executed.

Embodiments of the invention are discussed below with reference to FIGS. 1A-12. However, those skilled in the art will readily appreciate that the detailed description given herein with respect to these figures is for explanatory purposes as the invention extends beyond these limited embodiments.

One protocol is iSCSI (Internet Small Computer System Interface). iSCSI is used for interconnecting storage arrays to a network, which enables the transport of SCSI commands over Ethernet connections using TCP/IP (i.e., for IP networks). In such configurations, an iSCSI storage implementation can be deployed using Ethernet routers, switches, network adapters, and cabling.

Another protocol is Fibre Channel. Fibre Channel is a high-speed network technology, which is primarily utilized in storage area networks (SANs). Storage arrays are the target devices in a SAN configuration, wherein the fabric and initiators all intercommunicate using the Fibre Channel protocol. Fibre Channel Protocol (FCP) is a transport protocol (similar to TCP used in IP networks) that predominantly transports SCSI commands over Fibre Channel networks.

In accordance with various embodiments described herein, a storage array configurable for Fibre Channel mode or iSCSI mode or both is provided. The storage array can include logic and hardware to operate in the iSCSI mode and can implement one or more Ethernet cards. To operate in the Fibre Channel mode, the storage array is provided with a Fibre Channel (FC) card (e.g., a hardware card of the controller). The FC card is the link between the Fibre Channel physical network (i.e., PHY) and the Fibre Channel driver (FC) driver of the storage array.

FIG. 1A provides one example view of a storage array SCSI target stack 100. The stack includes a volume manager (VM) 102, which broadly includes the operating system (OS) 106 of the storage array and an IO handling protocol that processes read and write IO commands to storage of the storage array. The IO handling protocol, in one embodiment, is referred to herein as a cache accelerated sequential layout (CASL) process, which intelligently leverages unique properties of flash and disk of the storage array to provide high performance and optimal use of capacity. CASL functions as the file system of the array, albeit processing is generally performed at the block level instead of file level.

Below the VM 102 is a SCSI layer 104, which is configured to handle SCSI commands. In one embodiment, the SCSI layer 104 has been implemented to be independent of iSCSI transport functionality. For example, in storage arrays configured for pure iSCSI mode operation, the iSCSI transport 112 may include logic that is shared by the SCSI layer 104. However, to implement a Fibre Channel operating storage array, the SCSI layer 104 has been implemented to remove dependencies on the iSCSI transport 112. The SCSI target stack 100 further includes a Fibre Channel (FC) transport 110, which functions as user space for running various processes, which are referred to herein as daemons. The user-space of the FC transport 110 serves as the conduit to the SCSI target (i.e., SCSI layer 104).

A Fibre Channel (FC) driver 116 is further provided, which is in communication with a Fibre Channel (FC) card 118. In one embodiment, in order to interact with the FC card 118, which is a dedicated hardware/firmware, a dedicated FC driver 116 is provided. For each FC card 118 (i.e., supporting one or more ports) in an array, an instance of the FC driver 116 is provided. In one embodiment, a single FC card 118 may be used. The FC card 118 and FC driver 116 may be used to access all FC target ports. In some configurations, however, multiple kernel driver threads may be used to improve performance. In still other configurations, different FC cards 118 from different vendors may be simultaneously supported or used in a single controller. In such a configuration, separate drivers for these device types may be used. The FC driver 116 is, in one embodiment, a kernel level driver that is responsible for interacting directly with the FC card 118 to retrieve incoming SCSI commands, request data transfer, and send SCSI responses, among other things. In one embodiment, the FC card 118 may be an adapter card, which includes hardware, firmware and software for processing Fibre Channel packets between the Fibre Channel fabric and the FC driver. In one specific example, the FC card 118 may be a Fibre Channel Host Bus Adapter (HBA) card, available from Emulex Corporation, located in Costa Mesa, Calif. If the storage array is configured for iSCSI mode, Linux sockets are used to communicate with a TCP/IP network interface card (NIC), for communication with an Ethernet fabric.

Figure 1B:
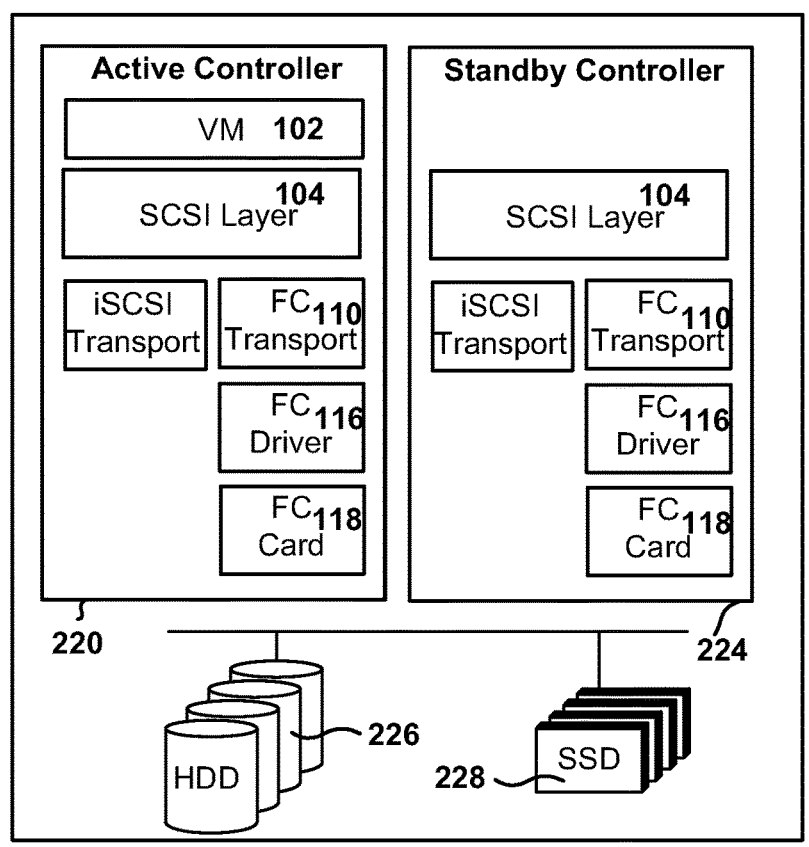
FIG. 1B illustrates an example of a storage array with an active controller and a standby controller in accordance with one example.

FIG. 1B illustrates an example of a storage array 202, which includes an active controller 220, a standby controller 224, and storage (i.e., hard disk drives (HDDs) 226, and solid state drives (SSDs) 228). This configuration shows the storage array SCSI target stack 100 usable in each of the active and standby controllers 220 and 224, depending on the state of operation. For example, if the active controller 220 is functioning normally, the standby controller is not serving IOs to and from the storage, and ports of the standby controller are simply operational in a standby (SB) state in accordance with an asymmetric logical unit access (ALUA) protocol. The ALUA protocol is described in more detail in a Fibre Channel standard, entitled "*Information technology—SCSI Primary Commands—4 (SPC-4)*", revision 36s, dated 21 Mar. 2014 (Project T10/BSR INCITS 513), which is incorporated herein by reference. Generally speaking, ALUA is a multi-pathing method that allows each port (e.g., Linux-IO Target) to manage access states and path attributes using assignments that include: (a) active/optimized (AO); (b) active/non-optimized (ANO); (c) standby (SB); unavailable (UA); and (d) logical block dependent (LBD).

In the example of FIG. 1B, it is noted that the standby controller 224 may not have the iSCSI transport 112 during the time it operates as a "standby" controller. If failover occurs and the standby controller 224 becomes the active controller 220, then the iSCSI transport 112 will be populated. Note also, that during Fibre Channel operation, the FC transport 110 is the module that is in operation. Alternatively, if the storage arrays are used in an iSCSI configuration, the iSCSI transport 112 will be needed, along with the Linux Sockets 114 to enable Ethernet fabric communication.

Figure 2A:
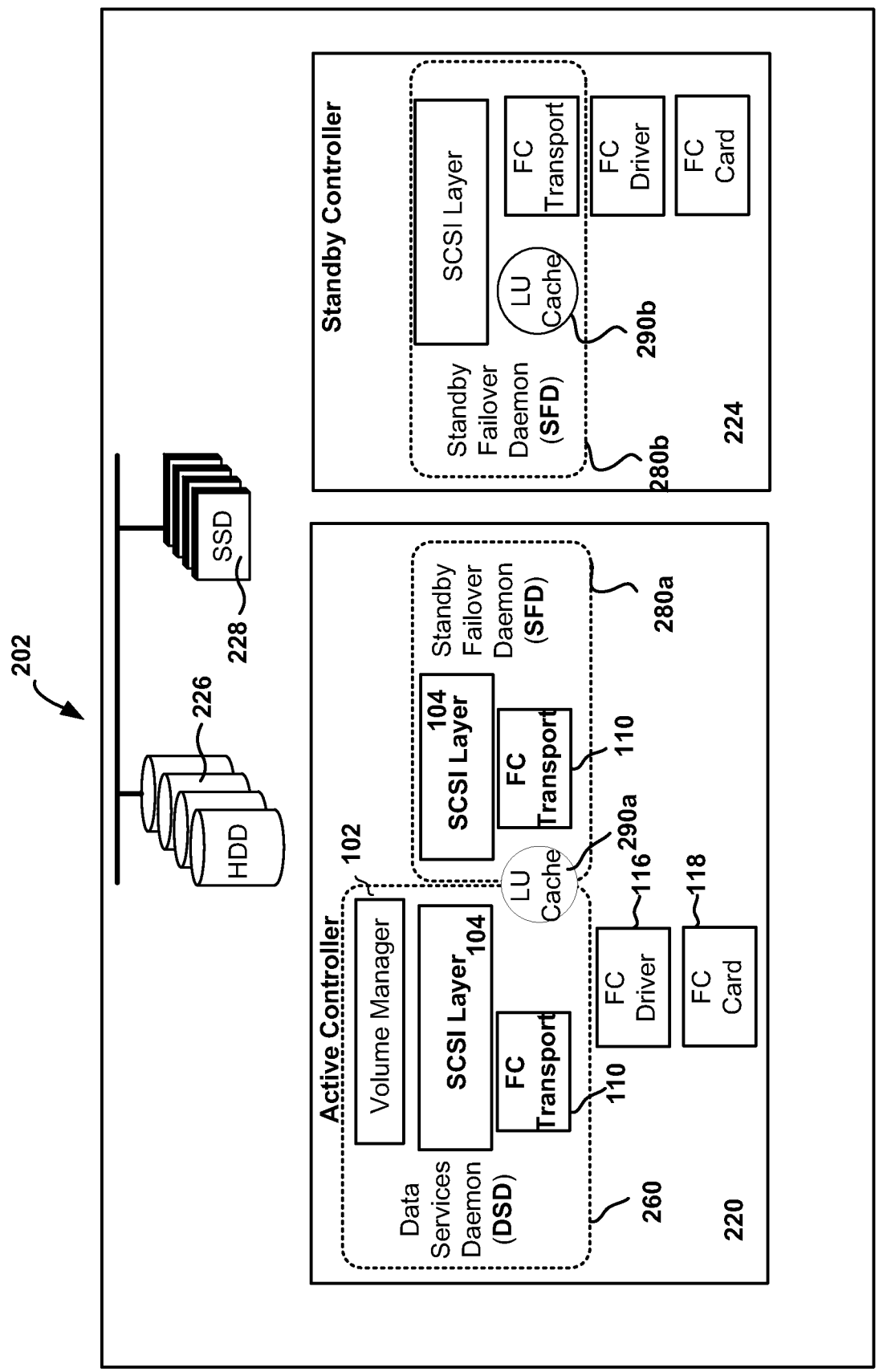
FIG. 2A shows an example of the active controller, which is configured with a data services daemon in accordance with one example.

FIG. 2A shows an example of the active controller 220, which is configured with a data services daemon (DSD) 260. DSD 260 is designed to provide full access to the storage array 202 via the VM 102, which includes serving IOs to the volumes of the storage array 202 (e.g., in response to initiator access requests to the SCSI target storage array 202). The DSD 260 of the active controller 220 is a user space process. For failover capabilities within the active controller 220 itself, the user space of the active controller 220 also includes a standby failover daemon (SFD) 280a. The SFD 280a is configured as a backup process that does not process IOs to the volumes of the storage array 202, but can provide limited services, such as responding to information SCSI commands while the DSD 260 is re-started (e.g., after a crash). If the SFD 280a takes over for the DSD 260, the I_T Nexus (i.e., connection) between initiators and the target array remain un-terminated.

The standby controller 224 of the storage array 202 is also configured with an SFD 280b in its user space. As noted above, the ports of the standby controller 224 are set to standby (SB) per ALUA. If a command is received by the SFD of the standby controller, it can process that command in one of three ways. In regard to a first way, for many commands, including READ and WRITE, the SCSI standard does not require the target to support the operation. For this case, SFD 280b returns the SCSI response prescribed by the standard to indicate non-support. In a second way, among the mandatory-to-support SCSI commands, there are certain commands for which initiators expect quick response under all conditions, including during failover. Examples include, without limitation, INQUIRY, REPORT_LUNS, and REPORT_TARGET_PORT_GROUPS. For these commands, SFD 280b responds locally and independently. In a third way, for other mandatory-to-support SCSI commands (such as PERSISTENT_RESERVATION_IN/OUT), the SFD 280b will depend on the DSD 260 process running on the active controller 220. Thus, a forwarding engine is used to forward SCSI commands from the standby controller 224 to the active controller 220. The active controller 220 will process the commands and sends responses back to the standby controller 224, which will in turn send them to the initiator.

For commands that need to be processed locally, all information required to create an accurate and consistent SCSI response will be stored locally in an LU cache 290a/b. In one embodiment, a logical unit (LU) cache will be present on each of the active and standby controllers 220/224, and consistency methods ensure that all LU cache states are updated. The SFD 280a/b uses the LU cache 290a/b to independently respond to a small number of commands, such as Inquiry, Report LUNs and RTPG.

Furthermore, in Fibre Channel, each FC transport endpoint is identified by a Fibre Channel (FC) World Wide Node Name (WWNN) and World Wide Port Name (WWPN), or generally referred to as World Wide Name (WWN). It is customary and expected that all ports for a given target advertise the same single WWNN. The client OS storage stack will establish a single FC connection to each available FC transport endpoint (WWNN/WWPN pair). In the example of storage array 202, it may have two FC transport endpoints for each of the active controller 220 and the standby controller 224. That is, the active controller 220 may have two ports (i.e., two WWNN/WWPN pairs), and the standby controller 224 may also have two ports (i.e., two WWNN/WWPN pairs). It should be understood that the configuration of the storage array 202 may be modified to include more or fewer ports.

For an FC configuration, because there are multiple LUNs accessible through an SCSI I_T nexus, and there is no free-format "target name" into which lookup information can be embedded, logical unit number (LUN) mapping is maintained for each initiator. The LUN mapping is configured to persistently store the mapping information and maintain consistency across reboots. The LUN mapping is stored in the LU cache 290a/b. The DSD 260 and SFD 280a and 280b are provided with direct access to the LU cache 290a/b. The LU cache 290a/b will also store inquiry data and port state information. In one embodiment, a GDD (Group Data Daemon) and a GMD (Group Management Daemon) will maintain LUN mapping information for each initiator. GDD and GMD are management processing for configuring the storage array 202 and for maintaining settings and configurations during operation. GDD, from SCSI perspective, is configured to work with SCSI layer 104 to handle SCSI Reservation and TMF (task management function). In one embodiment, GDD will support iSCSI login and connection re-balancing for when the storage array 202 is configured and used as an iSCSI target.

Figure 2B:
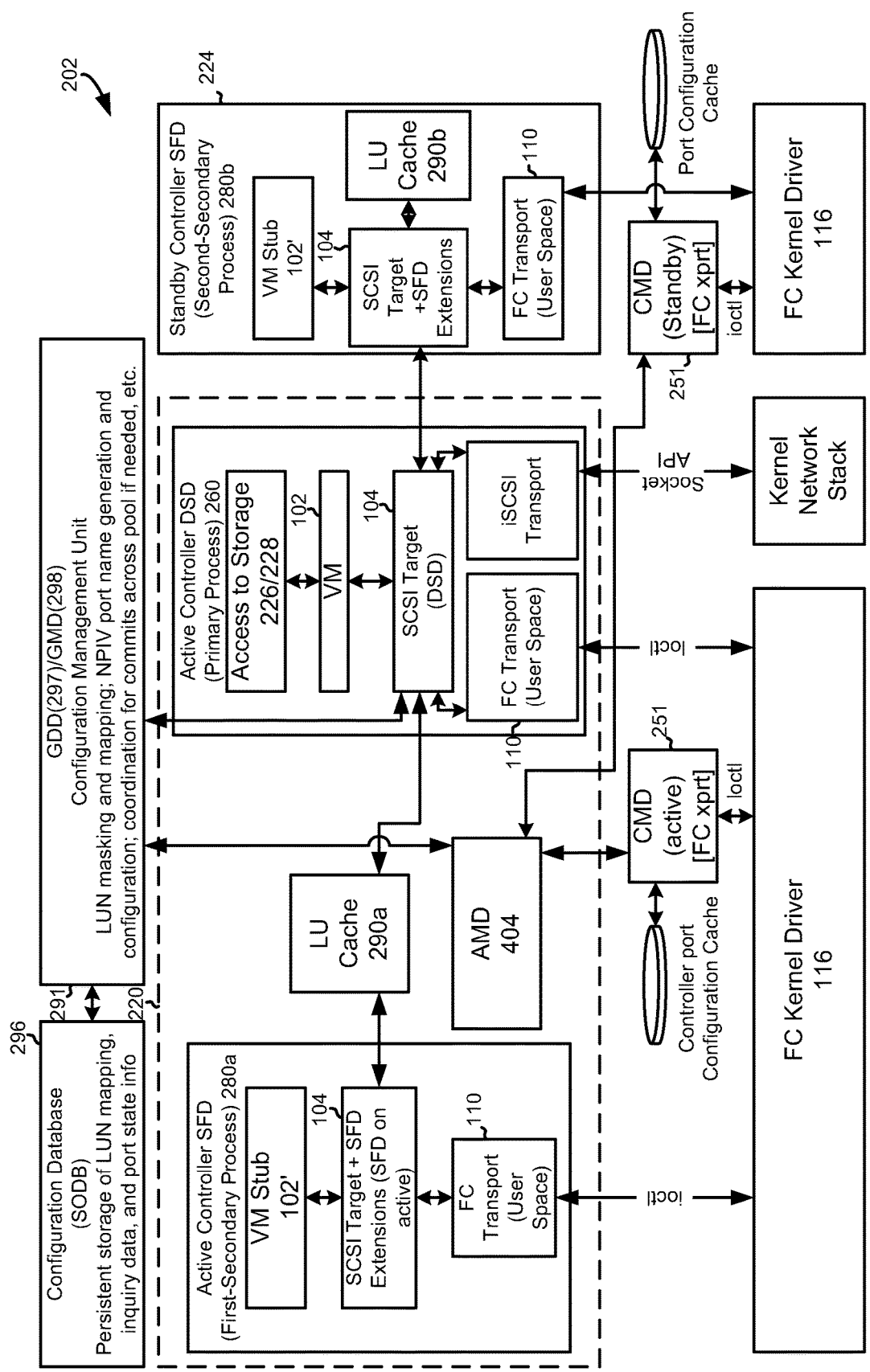
FIG. 2B illustrates an example logical diagram of a storage array, which includes an active controller and a standby controller.

FIG. 2B illustrates an example logical diagram of a storage array 202, which includes an active controller 220 and a standby controller 224. The active controller 220 is shown to include DSD 260 and SFD 280a, while the standby controller 224 includes an SFD 280b. Generally speaking, the DSD 260 is a primary process and the SFD 280a and SFD 280b are secondary processes. In one embodiment, the DSD 260 running on the active controller 220 is provided with access to a fully functioning volume manager (VM) 102, while the SFD 280a of the active controller 224 and the SFD 280b of the standby controller 224 are only provided with a VM stub 102'. This means that VM stub 102' is not provided with access to the storage of the storage array 202. For example, the SCSI layer 104 may make calls to the VM stub 102', as the code used for the DSD 260 may be similar, yet a code object is used so that an error or unavailable response is received from the VM stub 102', as no access to the VM is provided. Also shown is that the SFD 280a on the active controller 220 and the DSD 260 have access to the LU cache 290a. As noted above, the LU cache 290a is configured to store available LUN mapping, inquiry data and port state information. The standby controller 224 also includes an SFD 280b that has access to LU cache 290a.

As noted, a SCSI logical unit is visible through multiple Fibre Channel ports (namely, all of the ports which reside on arrays within the logical unit's pool). An initiator may issue a SCSI command to any of these ports, to request the port state for all ports through which the logical unit may be accessed. In one embodiment, this requires a CMD 251 (Controller Management Daemon) to monitor port state for FC target ports on a given array 202, report initial state and state changes to AMD 404 (Array Management Daemon). The AMD 404 will forward this information to GDD 297. GDD 297 is a clearing house for all FC target ports in the entire group, and will disseminate this information to DSD 260. DSD 260 will retrieve the port state and store it into the LU cache 290a.

In one embodiment, the SCSI layer 104 within DSD 260 and SFD 280 will need access to several pieces of system information, in order to process SCSI commands. This information includes LUN mapping information, e.g. to build REPORT_LUNS responses, and to validate and map a logical unit number to its associated volume. The SCSI layer 104 will need access to the FC port state to build REPORT_TARGET_PORT_GROUPS response, and to determine the port_identifier fields for certain SCSI INQUIRY responses. The LU cache 290a, being accessible to DSD 260 and SFD 280a will enable memory-speed access to the LU cache 290a. The DSD 260 is, in one embodiment, configured to build the LU cache 290a so it can quickly retrieve the needed LUN mapping and port state information from GDD 297 and make this information available to SFD 280a and 280b processes. The SFD 280b on the standby controller 224 maintains communication with DSD 260 on the active controller 220, to maintain an up-to-date copy of LU cache 290b.

At startup, DSD 260 needs an up-to-date LU cache 290a in order to handle incoming SCSI commands. Therefore, during startup, DSD 260 needs to retrieve from GDD 297 the LUN mapping configuration and current port state information, and populate the LU cache 290a (or verify the validity of the existing LU cache 290a). DSD 260 also needs to notify the SFD 280b on the standby controller 224 if the LU cache 290a contents are updated. DSD 260 also needs to interact with the FC kernel driver 116, to claim responsibility for current and future SCSI I_T nexuses and commands.

Thus, in order for DSD 260 to process non LU_CACHE-variety commands directed to a specific logical unit (e.g. READ and WRITE), the contents of the LU cache 290a is necessary, but not sufficient. The SCSI layer 104 within DSD 260 consults the LU cache 290a in order to validate the specified LU number, and to map the LU number to a backing-store volume. Then the SCSI command handler can process the command to the proper volume.

On the active controller 220, if the SFD 280b gains access (i.e., via port grab when DSD 260 goes down), SFD 280b will get the latest copy of the LU cache, as previously populated by DSD 260, which may be by directly accessing a shared memory segment. Thus, whenever DSD 260 is unavailable (e.g. crashed or is restarting), SFD 280a services certain SCSI commands. For LU_CACHE-variety commands, SFD 280a fully processes the commands using only information from the LU cache 290a. For other commands, SFD 280a returns appropriate responses indicating that the command could not be immediately completed.

On the standby controller 224, SFD 280*b* always responds to certain incoming SCSI commands. For LU_CACHE-variety commands, SFD 280*b* fully processes the commands using only information from the LU cache 290*b*. For commands which constitute LUN-level serializing events (e.g. SCSI Reservations, LUN_RESET), interaction with GDD 297 is required by the DSD 260 which is providing access to the affected LUN. In one embodiment, SFD 280*b* on the standby controller 224 is not permitted to communicate directly with GDD 297, so this is achieved using a proxy service provided for this purpose by DSD 260 on the active controller 220. If DSD 260 is available, the command is handled using this DSD proxy service. If DSD 260 is not available, error response is provided. For other commands, SFD 280*b* returns SCSI responses as appropriate for such commands received on ALUA standby ports.

In general and in one configuration, the two processes (e.g., primary process (DSD 260) and secondary process (SFD 280)) provide various advantages and efficiencies in storage architectures. One technical advantage is seamless transition from standby-mode to full active-optimized mode on the standby controller, as it becomes the active controller. Another technical advantage is reduced disruption on a single controller during short periods of DSD 260 down time (e.g. DSD crashes, but failover not triggered).

In one configuration, a storage array 202 includes an active controller 220 and a standby controller 224. As mentioned above, the LU cache 290*a* is a module shared by DSD 260 and SFD 280*a* that caches data needed to serve certain SCSI commands. With multi-LUN target Fibre Channel, the SFD 280*a* will also be serving SCSI commands, but SFD 280*a* does not have access to VM 102. Multi-LUN target is an implementation that requires tracking of LUN to Volume mappings. LU cache 290*a* is designed as a way for SFD 280*a* to provide volume attribute and LUN inventory information to the SCSI layer 104 in the absence of VM 102 access.

Conceptually, LU cache 290*a* sits between the SCSI layer 104 in DSD 260 and SFD 280*a* (i.e., user space), and the configuration information is stored in a configuration database 296, referred to herein as a scale-out database. As an advantage, the configuration database 296 stores configuration information, which may be used for scale-out and non-scale out implementations. The configuration database 296, in one embodiment, is designed as a persistent storage of LUN data (e.g., LUN inventory information (i.e., LUN mapping), inquiry data, port state info, etc.), which is provided to the DSD 260 by GDD 297 (e.g., based on changes made using GMD 298). The configuration database 296 is generally storing configuration data. LU cache 290*a* presents access interfaces to SCSI layer 104 and modifier interfaces to GMD 298 and GDD 297. In one embodiment, the GMD 298 and GDD 297 are collectively operating as a configuration management unit 291 for the array 202, as shown in FIG. 2B. The configuration management unit 291, e.g., one or both of GDD 297 and GMD 298, is further shown interfaced with the configuration database 296. In one embodiment, LU cache 290 is implemented as a library linked in by SFD 280*a*, DSD 260 and GDD 297.

In one embodiment, the configuration management unit 291 includes GDD 297 and GMD 298. In specific examples, GMD 298 (Group Management Daemon) is a process primarily responsible for system management of a storage group. A storage group is a cluster of arrays with a single shared management plane. In one example, GMD 298 provides APIs (programmatic interfaces) and CLIs (command line interfaces) by which administrators can perform management operations, such as provisioning and monitoring storage. In one example, GDD 297 (Group Data Daemon) is a process responsible for coordinating distributed data path operations in a storage group. For example, this may include acquiring and checking SCSI reservations, and iSCSI login permissions.

GMD 298 and GDD 297 further provide an interface to SODB (i.e., the configuration database 296), which is a persistent store for configuration information in a storage group, and it communicates with DSD 260, AMD 404, and other processes to perform management activities. The information in LU cache is a subset of the information in SODB. LU cache is initialized by fetching data from GDD 297, and then incremental updates are applied via GMD 298.

Figure 2C:
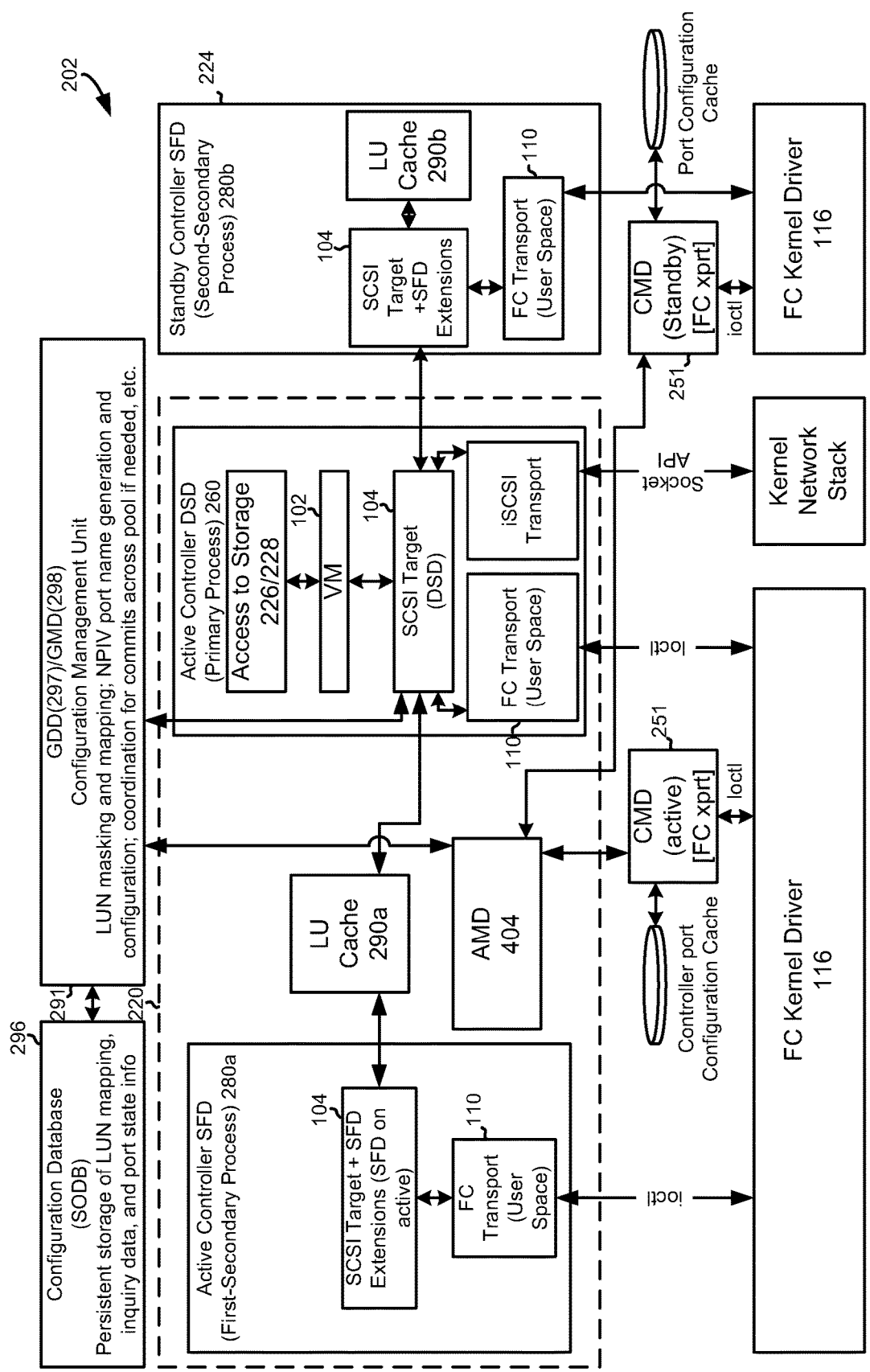
FIG. 2C illustrates another embodiment, wherein the VM stubs are not part of the design of FIG. 2B.

FIG. 2C illustrates another embodiment, wherein the VM stubs 102' are not part of the design. In this embodiment, different SCSI layer 104 libraries are used for SFD 280 (i.e., 280*a* and 280*b*) and DSD 260. By providing different SCSI layer 104 libraries for SFD 280 and DSD 260, calls made to the VM 102 via the SCSI layer 104 of either the active controller SFD 280*a* or the standby controller SFD 280*b* will not be provided with access to the VM 102. In one embodiment, an error may be returned or an unavailable response may be returned by the SCSI layer 104 library of the respective SFD 280. In one embodiment, the SCSI layer 104 of the SFD 280*a* and 280*b* implement error handling, which avoids the need for a VM stub 102'. On the other hand, if the SCSI layer 104 of the active controller DSD 260 receives the request to access the VM 102, access will be provided.

Figure 3:
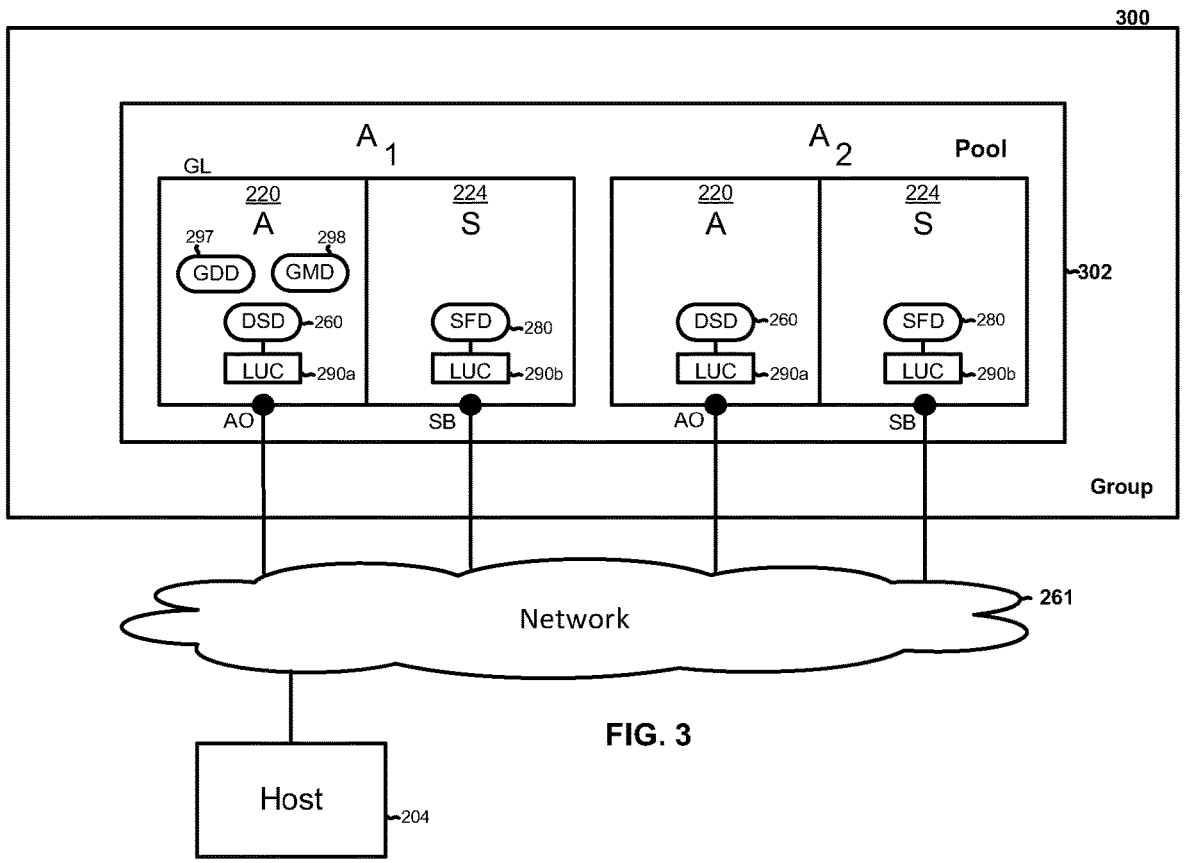
FIG. 3 illustrates an example configuration of a group of arrays that are connected to a network, to provide access to a host, in accordance with one embodiment.

FIG. 3 illustrates an example configuration of a group of arrays 300 that are connected to a network 261, to provide access to a host 204, in accordance with one embodiment. Broadly speaking, the network 261 can provide conductivity using one or more networking devices to allow a plurality of hosts 204 to connect to the group of arrays 300 (i.e., a group), depending on the configured use of the storage array system. In this illustration, a pool 302 is defined for two storage arrays A1 and A2. In this configuration, storage array A1 is configured as the group leader (GL), which will manage a number of management tasks of the group of arrays 300.

In one embodiment, a management function is performed by logic of GDD 297 (Group Data Daemon), which is additionally responsible for path discovery operations, which will maintain current information regarding port status, including identifying which ports of arrays are available and their respective ALUA state. As will be described in greater detail below, GDD 297 is configured to communicate with DSD 260 of each of the arrays in the group of arrays 300, in order to determine the status of the ports. The status of the ports can identify, for example, an ALUA state of active optimized (AO), an ALUA state of standby (SB), or transitioning, or unavailable, or off-line, etc.

Another management function is performed by logic of GMD 298 (Group Management Daemon), which is a process used to initiate volume moves from one array to another, from one array of a first pool to another array of a second pool, and manage the communication of volume information metadata to a destination array, and also manage the transfer of the data to the destination array while managing bin migration.

Further shown is that each active controller 220 will include DSD 260, and each standby controller 224 will include SFD 280. As discussed above, an LU cache 290 will be associated with each of the active controller 220 and the standby controller 224. DSD 260 is capable of executing processes for reading and writing to the LU cache 290*a*, and the SFD 280 is capable of executing processes for reading and writing to the LU cache 290*b*. In this example, the active controller 220 of each of arrays A1 and A2 are currently identified as being active optimized (AO), while the standby controllers 224 of each of arrays A1 and A2 are identified as being standby (SB), according to the ALUA standard.

In one embodiment, new arrays can be added a pool 302. This functionality is performed by GMD 298, which includes a series of actions. These actions may include to copy of information regarding volume structures to the new array, update the bin map, update pool_uid of the new array to indicate it has joined the pool, and notify a bin migration service to start re-balancing the volume across the newly added array. In one embodiment, reference to a volume may also include other data that makes up the volume, such as snap-shot data associated with the volume. In some embodiments, the volume data and snap-shot data may collectively be referred to as a volume family (VF). In this work flow, new array's LU cache is populated as soon as VF structures and bin map are updated on the new array. By updating the bin map, hosts desiring access to a volume will be given accurate information regarding the LUN paths to the volume. As described in more detail below, a process for maintaining LU cache updated regarding ports status will also ensure that a host has correct and current paths to the volumes needing access.

In another embodiment, an array from a pool 302 can be removed. This functionality is performed by GMD 298, which includes a series actions. These actions may include to have a bin migration service evacuate all data on the array. The bin map will be updated accordingly. Then, vol/snap ops are locked, and removal of all VF structures from the array is performed. Then, vol/snap ops are unlocked and array pool_uid is set to invalid. In one embodiment, the LU cache is updated on the leaving array at the beginning of "Remove all VF structures". This will remove those LUs from the LU map, resulting Unit Attention (REPORT LUNS DATA HAS CHANGED) set on the affecting SCSI ITNs for initiators to pick up at the next SCSI I/O command, to trigger initiators to rediscover LU inventory and ALUA paths (i.e. remove ALUA paths pointing to this leaving array.

In one embodiment, functionality is provided to enable merging two pools. In this function, all VFs on the two pools are expanded on all the arrays in the two pools, and then one of the pools is deleted after changing the pool_uid of all the VFs on that pool to the other pool. By way of example, if a merge is of pool B into pool A, similar to adding an array to a pool, this operation will perform actions to copy VF metadata and bin map from one pool to the other pool. For instance, for all VFs in pool A, copy VF structure and the bin map to each array in pool B. For all VFs in pool B, copy VF structure and bin map to each array in pool A. In one transaction, change the pool_uid of all volumes and all arrays in pool B to pool A. Similar to "add array to pool", once all VFs metadata and bin map are updated on arrays in both pools, LU cache on all arrays in two pools will be updated with the new LU map data.

Volume moves are further enabled, which is sometimes referred to FC volume migration. In one embodiment, VF pool reassignment will perform a series of actions. These actions may include a copy of VF structures and bin map to the new pool. At that point, VF metadata is available in both pools. Then, migrate VF data from the old pool to the new pool through bin migration. Bin map will be updated accordingly while bin migration is making progress. Once all the bins have been migrated to the new pool, pool_uid in the VF is changed to the new pool. Then, remove VF structures from the old pool. Now the VF metadata is only available in the new pool. In one embodiment, after VF structure and bin map is copied to the new pool, the LU Cache is updated on arrays in the new pool to add information about this VF. After all bins are gone from the old pool, and at the beginning of VF removal action on the old pool, LU Cache is updated on arrays in the old pool to remove information about this VF.

Figure 4:
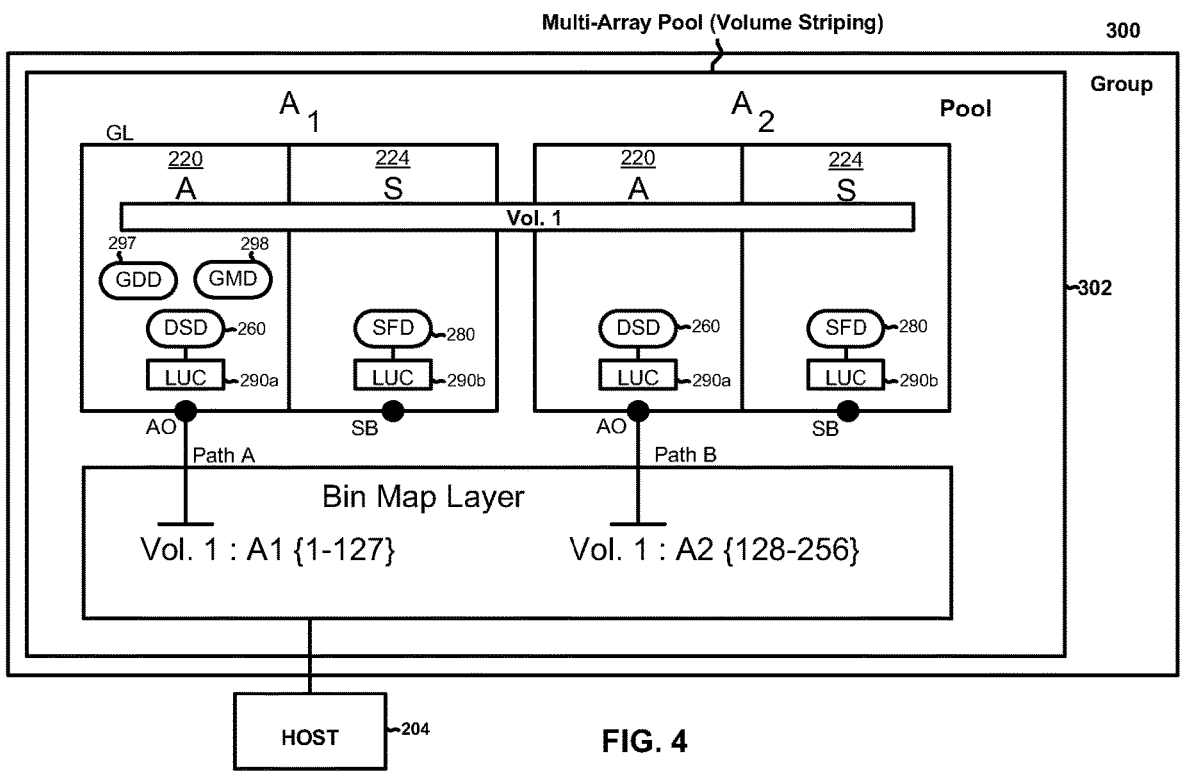
FIG. 4 illustrates a group of arrays, which include a volume that has been striped across arrays A1 and A2, in accordance with one embodiment.

FIG. 4 illustrates a group of arrays 300, which include a volume that has been striped across arrays A1 and A2, in accordance with one embodiment. In one configuration, the pool 302 can be configured with any number of arrays, so as to enable scale-out of the storage array system. In this example, a bin map layer is configured to manage a bin map that identifies which data of the volume Vol. 1 is located in each of the arrays A1 and A2. By way of example, it is shown that Vol. 1 has bins 1-127 stored in array A1, and bins 128-256 stored in array A2. Further, it is shown that the paths to the volume Vol. 1 is via path A and path B, which correspond to the active optimized (AO) ports of arrays A1 and A2. If another array were to be added to the pool 302, it would also be possible to striped the Vol. 1 across three arrays, or more depending on the desired storage configuration. The bin map would also be adjusted accordingly, based on the distribution of data/bins across the various arrays.

FIG. 5 illustrates an example of three arrays A1, A2 and A3, having volumes Vol. 2 and Vol. 3 striped across the various arrays. As mentioned above, the systems described herein enable the flexibility of adding more arrays to a group of arrays, and defining one or more pools within a group of arrays. Within each pool, it is possible to stripe volumes across the arrays of the given pool. Thus, flexibility is provided to create assign a pool to a given group, unassigned a pool from a group, merge pools, and managed associated data transfers. If a pool is going to be unassigned from a given group, and embodiment described herein enables data to be migrated off of the arrays in the pool to be unassigned, and then update metadata to note which array was unassigned and is no longer part of the pool.

FIG. 6 illustrates an example of a bin map 600 that keeps track of the distribution of bins associated with the volumes stored on arrays A1-A3 of FIG. 5. By way of example, volumes Vol. 2 and Vol. 3 are illustrated, and tracked by bin 600, although any number of other volumes can be tracked in a similar fashion. For purposes of example, it is shown that volume Vol. 2 is striped across A1, A2 and A3. An example distribution of the bins that represent data stored in each of the arrays is maintained in the bin map 600. In this example, for Vol. 2, array A1 contains bins 1-67, array A2 contains bins 68-127, and array A3 contains bins 128-256. Volume Vol. 3 is also striped across arrays A1-A3. In the bin map 600, it is shown that array A1 contains bins 200-256, array A2 contains bins 1-127, and array A3 contains bins 128-199. It should be appreciated that the example number of volumes, the volume numbers, and the bin numbers are provided simply by way of example, and they are not specific to any one implementations. In practice, the implementer of the storage array will assign their own volumes, volume names, types of data, and amounts of data. Based on the configuration, the bin map 600 will reflect the location of the data for the volumes striped across the arrays.

FIG. 7A illustrates a table 700 for report target port groups (RTPG) data, which is collected and maintained accurately using the above-described management function performed by GDD 297. The management function performed by GDD 297 is configured to interrogate each one of the DSDs 260 of each of the arrays A1-A3, in this example. The interrogation is configured to pull port status associated with each individual array. Once this data has been collected, the management function performed by GDD 297 is configured to instruct that each DSD 260 and write to their respective LU cache 290a the status of all other ports of the other arrays that are part of the group.

For illustration purposes, each one of the arrays is shown to include connections C1 and C2 to ports. Table 700 identifies the arrays 702, the port connections 704, and the ALUA status 706. This information was gathered by GDD 297 and then communicated back to all of the respective DSDs 260 for writing to the LU cache 290a. In one embodiment, the DSD 260 of each array A1-A3, is configured to communicate the updated LU cache information received from GDD 297, so that LU cache 290b of the standby controllers 224 can also be maintained with the current RTPG information.

In table 700, a representation is shown of the arrays, port connections, and ALUA status, which correlate to the example arrays A1-A3 of FIG. 5. As will be discussed in more detail below, the management function performed by GDD 297 to maintain the RTPG information implements a process that repeats periodically after a certain amount of time has expired. By way of example, one implementation utilizes five seconds as the period of time. In some embodiments, less than five seconds may be implemented to maintain the RTPG information or current, and in some embodiments more than five seconds may be implemented.

It should be understood that five seconds is only one example and it is envisioned that the setting can be adjusted either by a manufacturer of the storage system or can be set as a programmable feature that may be adjusted by an operator of the storage system. Broadly speaking, the timeframe in which the repeating is to occur simply requires that it be performed more than one time or intermittently or on demand or when needed, to maintain the RTPG information refreshed.

Figure 7B:
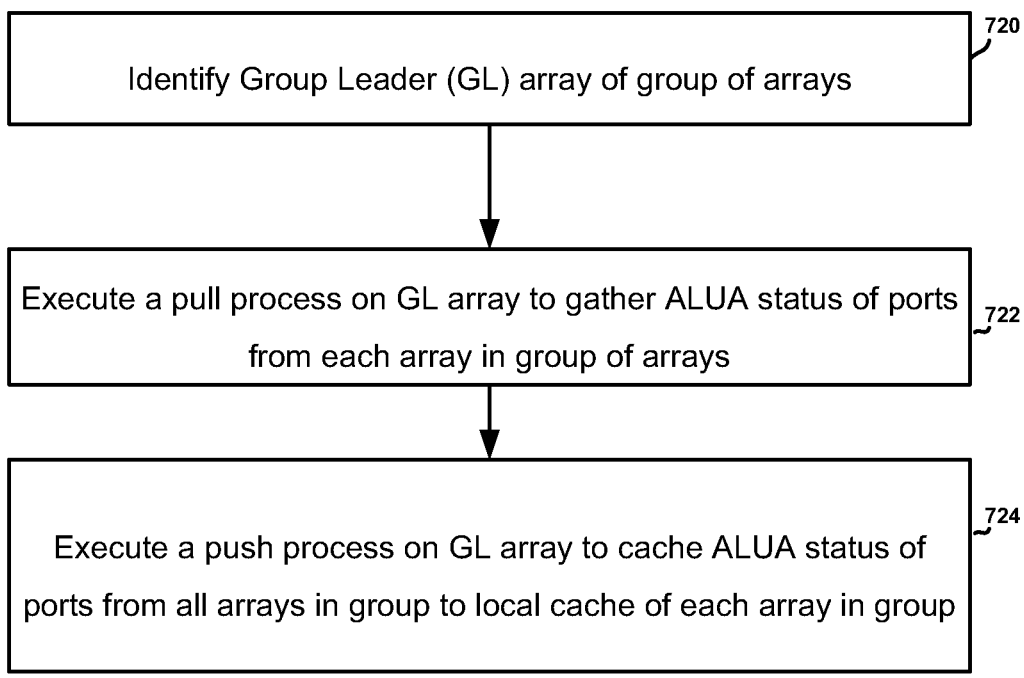
FIG. 7B illustrates a flow diagram of a process implemented by a management function to maintain the RTPG information current, in accordance with one embodiment.

FIG. 7B illustrates a flow diagram of a process implemented by GDD 297 to maintain the RTPG information current, in accordance with one embodiment. In operation 720, a group leader (GL) is an array of a group of arrays that is designated as the array that will execute management functions. Thus, GDD 297 is executed by a GL of a group of arrays. In operation 722, the process for maintaining RTPG information current includes executing a pull process to gather ALUA status of ports from each array in the group of arrays. The pull process includes having the GDD 297 communicate with DSD 260 of the array in which GDD 297 is processing, as well as communicate with all other DSD 260 of all of the arrays that are part of the group. The communication with DSD 260 includes an instruction to DSD 260 to gather information regarding available ports, and identify which of the ports are operating in which ALUA standard mode. This information is then communicated by each DSD 260 back to the process executed by GDD 297.

In operation 724, GDD 297 is configured to execute a push process in order to cache/write ALUA status of ports of all arrays in the group to local cache of each array in the group. In one embodiment, GDD 297 will communicate with DSD 260 of each one of the arrays that are part of the group, and instruct DSD 260 to write the information that was collected by the GDD 297 process. In this manner, the DSD 260 of each array in the group of arrays will be able to store the gathered information to the LU cache 290a of each one of the arrays. As mentioned above, the LU cache 290b of the respective standby controllers 224 will also be written with the information that is received from the DSD 260 that is local to that array.

Figure 8:
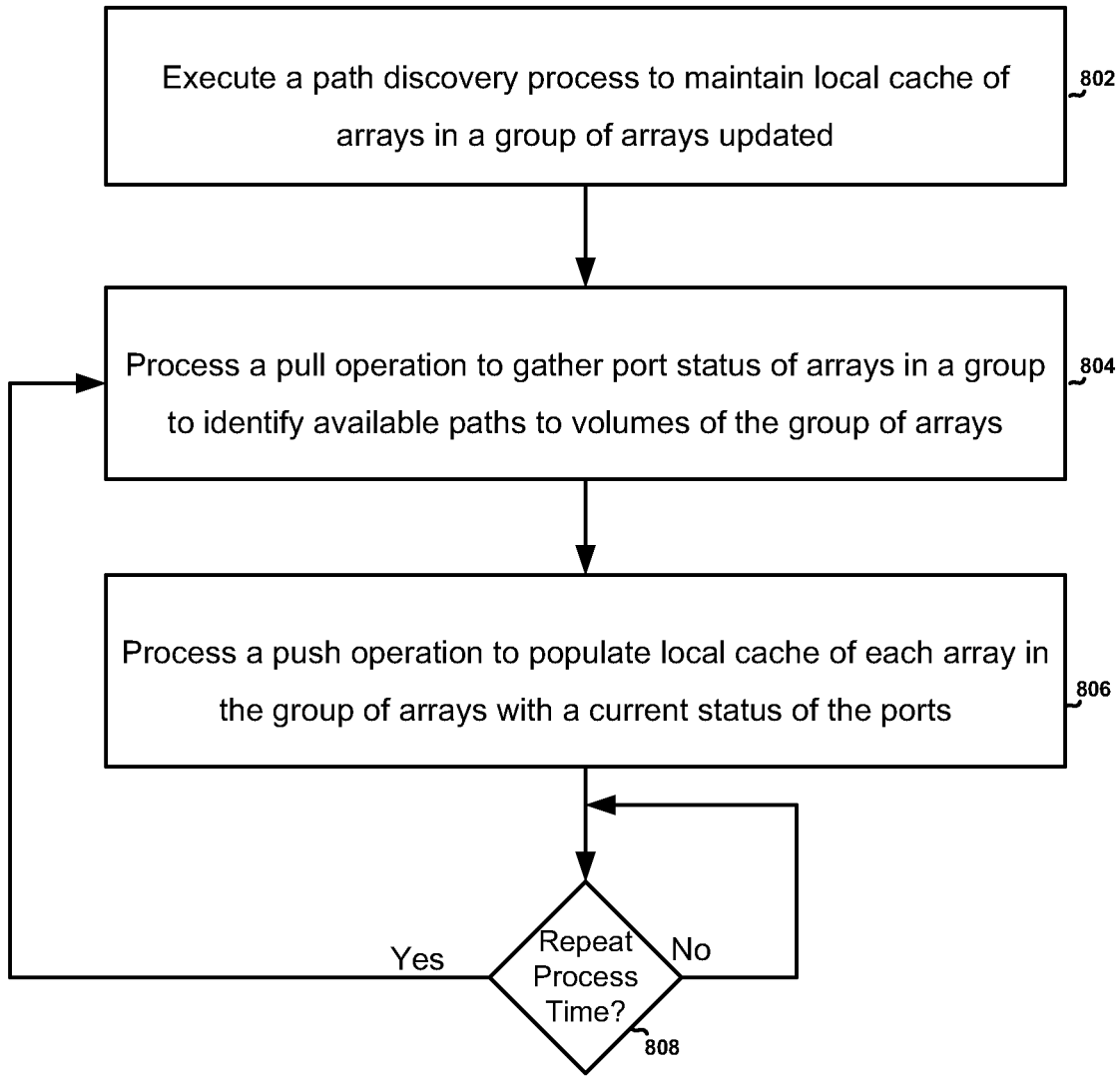
FIG. 8 illustrates a flowchart diagram of process operations performed for maintaining local cache of arrays consistent, in accordance with one embodiment of the present invention.

FIG. 8 illustrates a flowchart diagram of process operations performed for maintaining local cache of arrays consistent, in accordance with one embodiment of the present invention. As shown, operation 802 includes executing a path discovery process to maintain local cache of arrays and a group of arrays updated. Path discovery is required to identify which ports of each one of the arrays in the group of arrays is to be accessed by an initiator when access to one or more volumes of the group is processed. By maintaining path discovery consistent and accurate, initiators wishing to access specific volumes that are part of a group, defined by multiple arrays, will be given fast access to the data without repeat tries or unnecessary delays. In operation 804, a pull operation is performed to gather port status of arrays in a group to identify available paths the volumes of the group of arrays.

As discussed above, the pull operation is performed to gather port status from each of the arrays. This is performed by utilizing GDD 297, which is a management function of the group leader (GL) of a group 300. In 806, a push operation is processed to populate the local cache of each array in the group of arrays with a current status of the ports of each one of the arrays that are part of the group. As mentioned above, during the push operation, GDD 297 is configured to instruct DSD 260 of each array to write to the LU cache, so that each LU cache will maintain the information associated with the port status of all other ports of all other arrays that are part of the group.

In some embodiments, information regarding some ports of arrays that are part of the group may not be reported or identifiable if the storage array is down, rebooting, being serviced, or disconnected. In operation 808, it is determined if a repeat process time has expired, to enable a continuous cycling of operations 804 and 806. In one embodiment, the repeat process time is executed based on a periodic schedule. The periodic schedule can be configured to repeat after a period of time has expired. The periodic schedule is programmable and defined by a time-out window that continually cycles. As mentioned above, one configuration allows for the periodic schedule to have a timeout window of about five seconds. That is, after five seconds has expired, operations 804 and 806 are repeated. This process will continue while the storage system is operational, so as to maintain the LU cache of every one of the storage arrays current with information of the ports of all other arrays. This provides for consistency and inability of an initiator to query anyone of the arrays to identify port information associated with the group.

Figure 9:
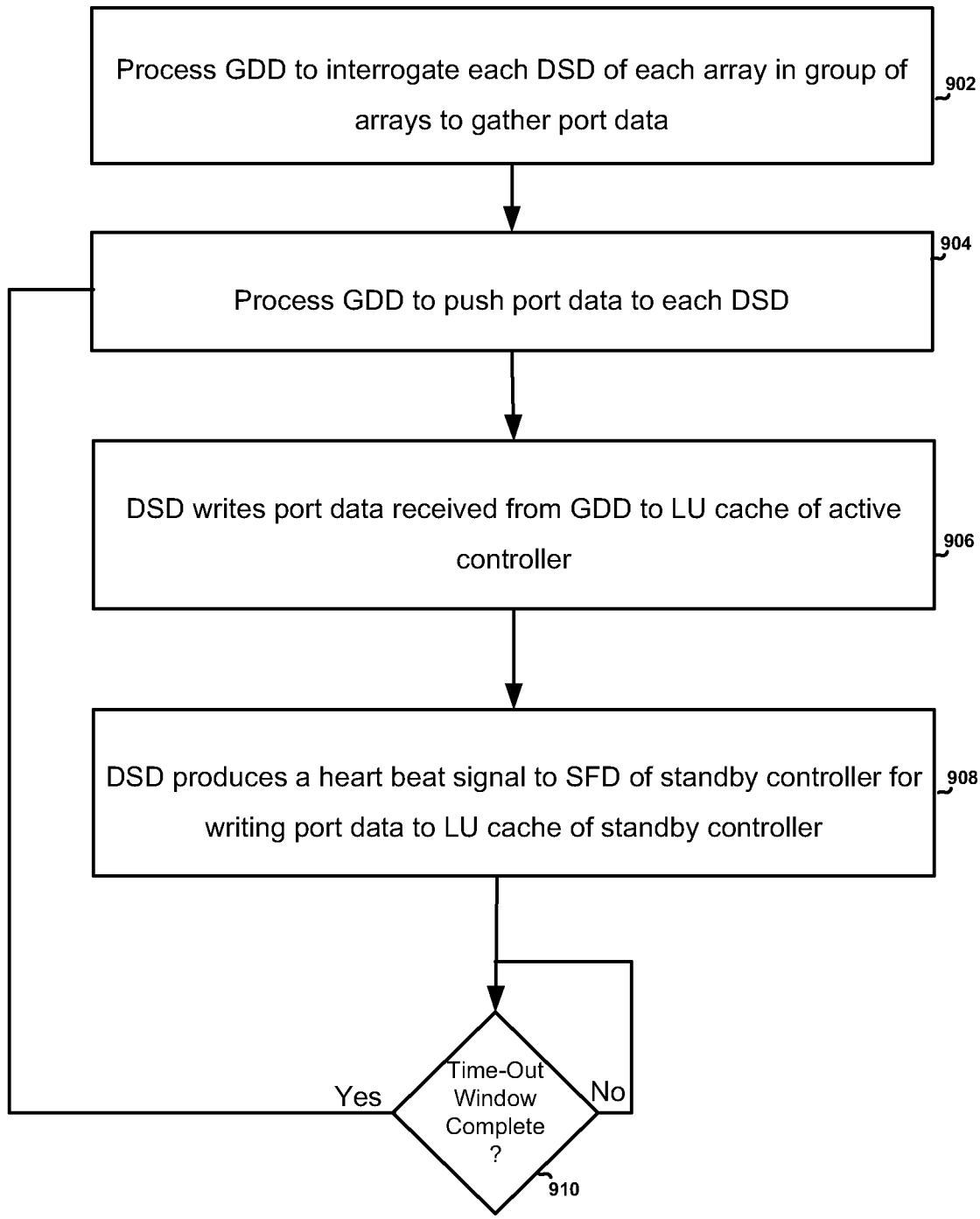
FIG. 9 illustrates another example of a process for maintaining consistency of LU cache in a storage system that has a group of arrays, in accordance with one embodiment.

FIG. 9 illustrates another example of a process for maintaining consistency of LU cache in a storage system that has a group of arrays, in accordance with one embodiment. In operation 902, the GDD 297 process is executed to interrogate each DSD 260 of each array in the group of arrays in order to gather port data. As mentioned above, the port data can include identification of which ports in the specific arrays are active, and which ports have which specific ALUA standard status. In operation 904, GDD 297 processes a push of the port data to each DSD 260 of each of the arrays of the group.

In operation 906, each of the DSD 260 in each array will write the port data received from GDD 297 to the LU cache of the active controller 220. In operation 908, DSD provides a heartbeat signal to SFD 280, which is used to communicate port data that was acquired by DSD 260 from GDD 297 to the LU cache of the standby controller 224. In this manner, the LU cache of the standby controller is also maintain consistent in case of a failover, which requires the standby controller to take over for the active controller of the specific array that's part of the group.

In operation 910, it is determined if a timeout window has been completed. As mentioned above, the timeout window is a period of time before the process is repeated by GDD 297. If the timeout window has been completed, operations 902, 904, 906, and 908 are repeated. If the timeout window has not been completed, the system waits before performing the repeat operations.

Figure 10A:
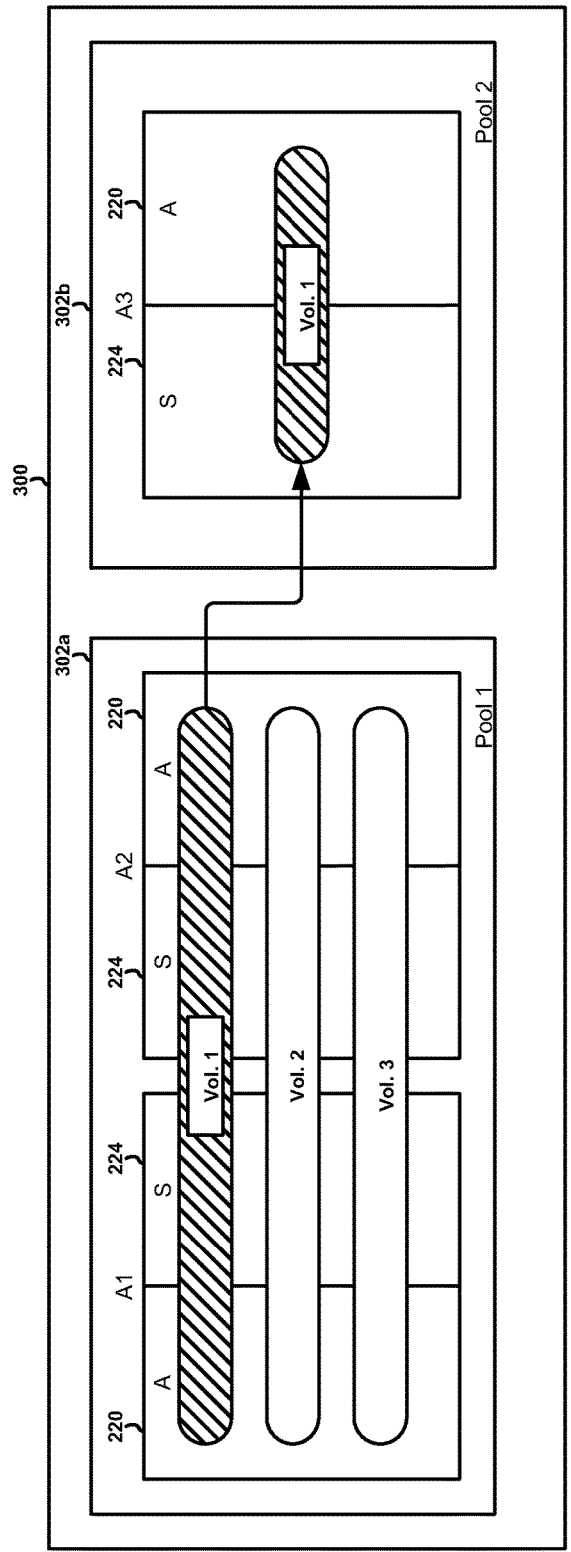
FIGS. 10A-10B illustrates a group, having multiple pools and bin migration processing, in accordance with one embodiment.
Figure 10B:
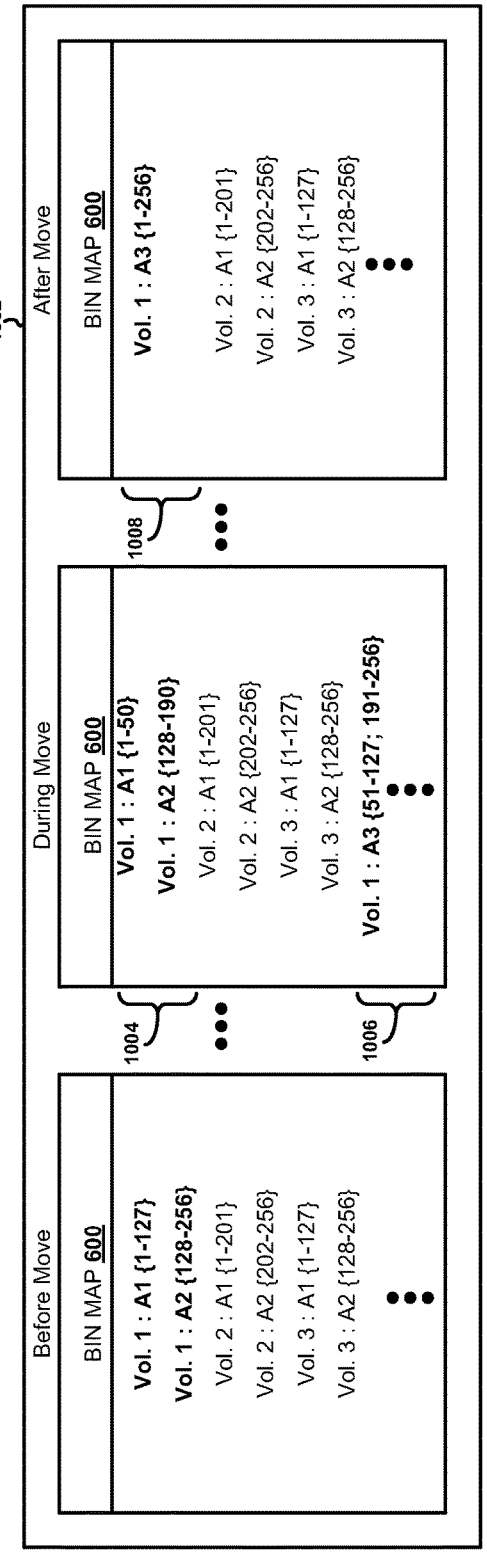

FIG. 10A illustrates a group 300, having multiple pools, in accordance with one embodiment. As shown, pool 1 includes arrays A1 and A2. Volumes Vol. 1, Vol. 2 and Vol. 3 are striped across arrays A1-A3. FIG. 10B illustrates an example of bin migration that occurs when a volume is moved from one pool to another pool, as illustrated in FIG. 10A. By way of example, volume Vol. 1 is being moved from pool 1 to pool 2. Pool 2 is shown to be a pool of 1, since only one array (A3) is part of pool 2.

When a volume is moved from one pool to another pool, bin migration must occur so as to maintain an accurate definition of where data is located in the group of arrays. Even while a volume is being moved, data is being moved over time, which necessarily means that certain data will still be present in the source location while it's being moved to the destination location. Bin map 600 before the move shows the location of certain example bins, including the bins that are striped across arrays A1 and A2. During the move, as the bins are being updated to correspond with data that's being moved, the bin map 600 will have the status of volume Vol. 1, as shown by 1004 in FIG. 10B.

The destination location, being array A3, will also illustrate which bins have been moved to array A3. This data will continue to change until all the bins have been correspondingly mapped to the destination array. By way of example, FIG. 10B shows the bin map 600 after the move of volume Vol. 1 has been completed, with the corresponding bins 1-256 moved to the array A3.

In one embodiment, as a volume is being moved, the corresponding data is moved and the bin map data is updated. In one configuration, when bins are associated with the destination array, the LU cache of the destination array is also updated with the bin map. In this manner, hosts can see the LUN as being active, and the volume can be accessed from the destination array. In one embodiment, once the move has been completed, the LU cache of the destination array or pool will have metadata that describes the volume, e.g., volume name, volume size, volume ownership, and will also have updated bin map data. Because the bin map has been update, hosts are able to see the new paths to the moved volume.

Figure 10C:
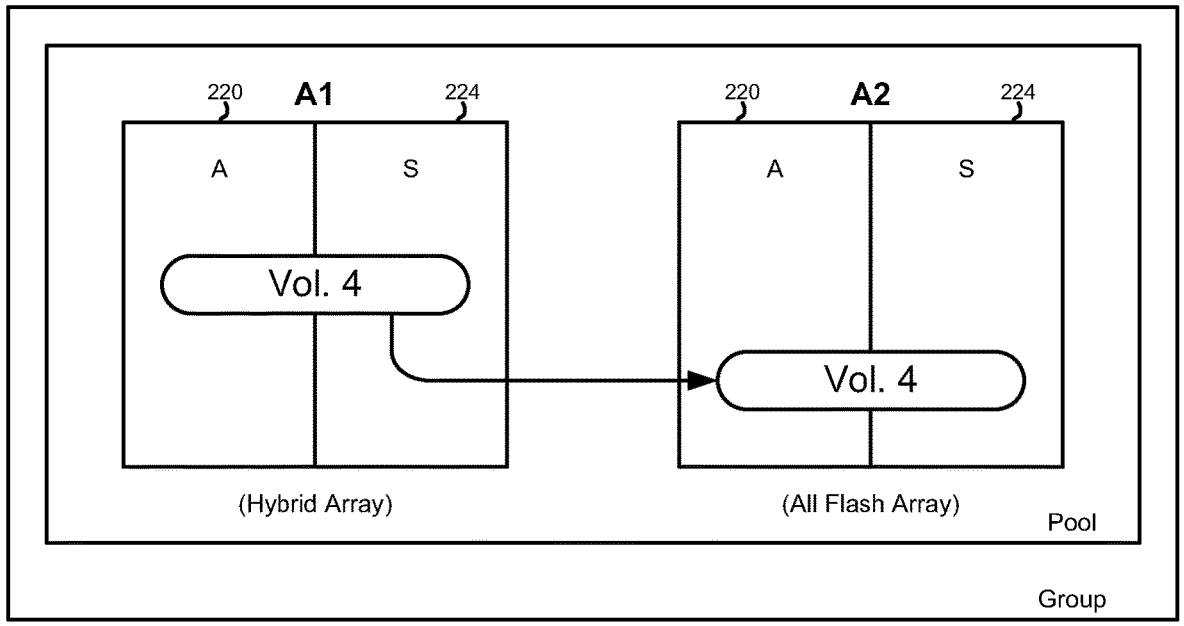
FIGS. 10C-10D illustrates an embodiment where volume moves can occur between storage arrays of different types.

FIG. 10C illustrates an embodiment where volume moves can occur between storage arrays of different types. As used herein, different types refers to the type of configuration in the storage media itself. For instance, one type of storage array can be referred to as a hybrid array, as it includes hard disk drives (HDDs) as well as solid-state drives (SSDs). Algorithms for storing data to hybrid arrays are described below, but generally SSDs are used to accelerate reading of data from the storage array, while maintaining primary storage in HDDs. In contrast, all flash arrays are those that incorporate only solid-state drives (SSDs) for all storage. In some configurations, storage systems are constructed using both hybrid arrays and all flash arrays. In other configurations, users of the storage arrays may wish to move volumes between arrays that are not of the same type.

Movement (sometimes referred to as migration) of volumes enables various storage management requirements, including expanding storage, bringing new arrays online, upgrading the processing power storage arrays, moving between more hybrid arrays to fewer hybrid arrays, transitioning data from hybrid arrays to all flash arrays, and other management tasks. In the example of FIG. 10C, is shown that a volume Vol. 4 is being moved from a hybrid array 2 in all flash array within a pool that is part of a group. The movement of the volume is enabled by managing movement of volume information as described with reference to FIG. 11, and FIGS. 10A and 10B.

As will be described in more detail below, GMD 298 is a management function that enables the movement of volumes between arrays of a group, and also enable movement of volumes between arrays of different types. This functionality is facilitated by processing GMD 298 operations, which instruct DSD 260 of a source array to transfer LU cache information regarding the volume to the destination array DSD 260. This communication provides for transfer of information related to the volume to the destination array in advance of or simultaneous with the beginning of the transfer of data associated with the volume being moved.

Additionally, the management functions performed by GDD 297, ensure that each one of the arrays that are part of the group, whether of the same type or not, are provided with updates regarding port information. Maintaining consistency in the information stored in each one of the storage arrays LU cache, ensures that any initiator may request port information of the group from any one of the storage arrays, and the response to the host will be the same. As mentioned above, the request for port information is typically provided by the host in the form of a RTPG request, which instructs the array to return information regarding the ports of the group. Accordingly, no matter whether the storage array is of a hybrid type or an all flash type, the management functions enable consistency of information provided to initiators after a move, and also ensure that bin map information is maintained consistent during moves, as described with reference to FIG. 10B.

Figure 10D:
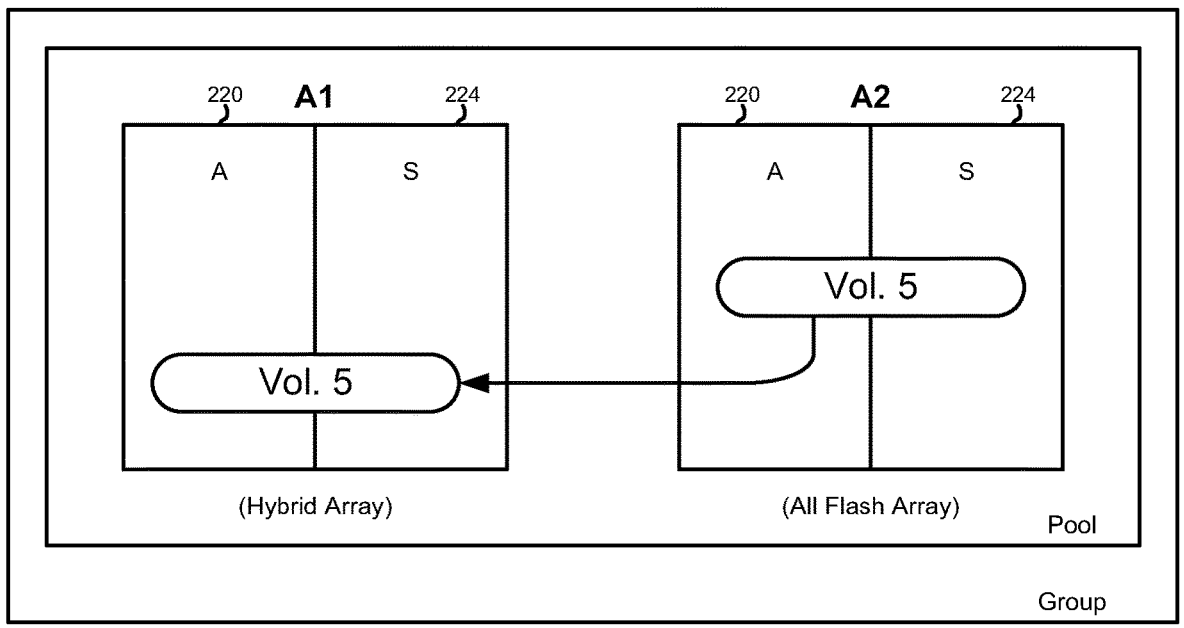

FIG. 10D is provided for purposes of completeness, to show that volume moves are possible in either direction between storage arrays of different types. In the illustration, it is shown that volume Vol. 5, is being moved from an all flash array A2, to a hybrid array A1. Although not shown for purposes of clarity, the management functions of GDD 297 and GMD 298 are processed by one of the arrays A1 or A2, depending on which is designated as the group leader. Each one of the arrays will also execute DSD 260, and will be in communication with LU cache 290*a*. As mentioned above, the LU cache 290*b* of SFD 280, associated with the standby controller will also be updated by the DSD 260. Thus, the ability to move volumes between arrays of different types removes the isolation between different types of arrays. Further, some data management configurations may benefit from having a group intentionally constructed using arrays of group different types.

Figure 11:
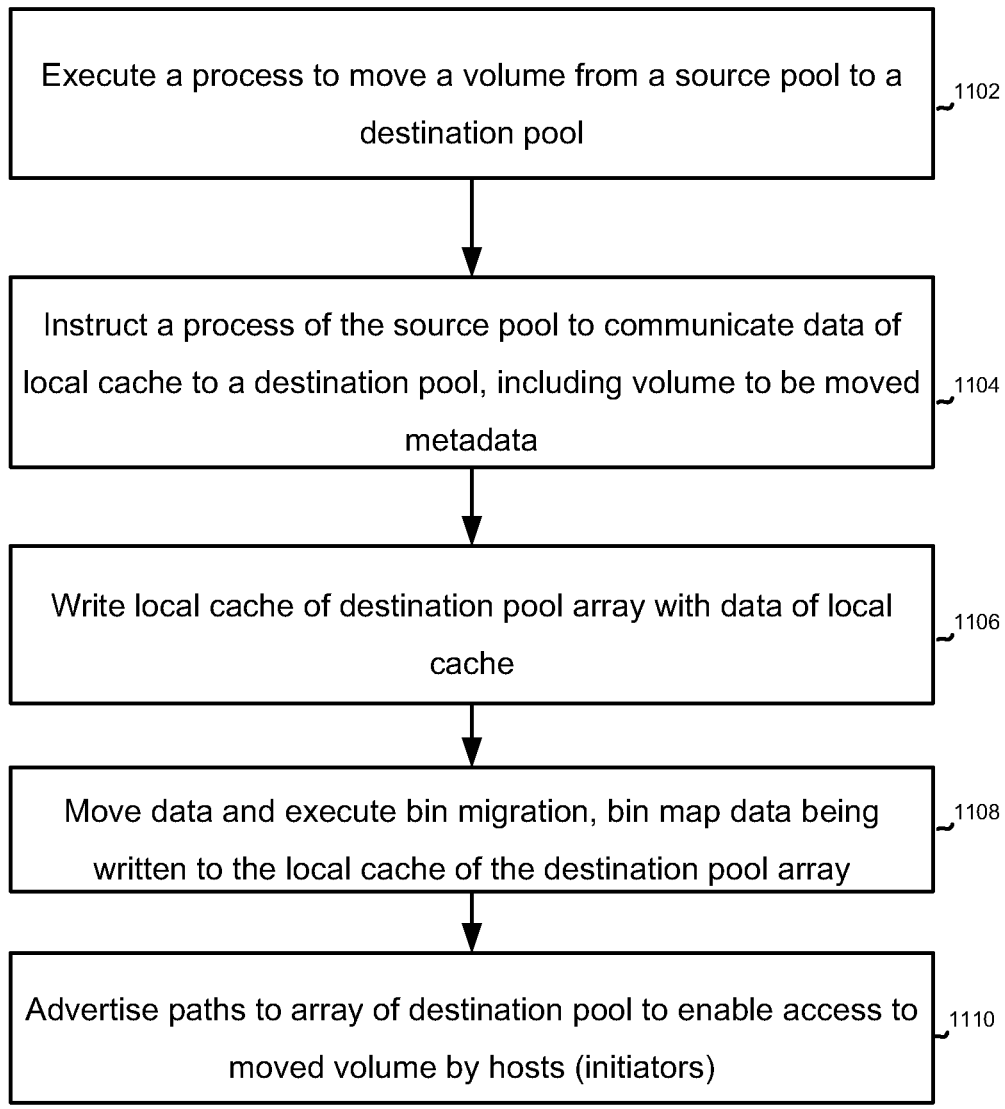
FIG. 11 illustrates an example method operation performed for executing a move of a volume, in accordance with one embodiment.

FIG. 11 illustrates an example method operation performed for executing a move of a volume, in accordance with one embodiment. Operation 1102 includes execution of a process to move a volume from a source pool to a destination pool. The source pool can have the volume either stored in a single array or in more than one array based on a defined striping configuration. The destination pool can be defined by a single array or can be defined by multiple arrays based on a defined striping configuration.

The example shown in FIG. 10A, shows that striped data of volume Vol. 1 was moved to a pool having a single array A3, but this is only one example of many configurations. In operation 1104, a process of the source pool will be instructed to communicate data of local cache that includes meta-data of the volume to be moved to a destination pool. In one embodiment, this process is managed by GMD 298, which is configured to instruct DSD 260 of an array in the source pool to communicate meta-data concerning the volume to be moved to a DSD 260 of an array associated with the destination pool. The meta-data can include information that identifies the volume.

This information can include, by way of example, the volume size, the volume name, volume ownership, and other identifying or addressing characteristics. In this manner, the destination pool is being prepped to include necessary identifying information of the volume that is to be moved to the destination pool, so that the destination pool will be quickly operational once the data has been transferred. In operation 1106, the local cache of the destination pool array is written with data of the local cache, which included the above described metadata about the volume. By way of example, the DSD of an array in the destination pool is provided with the metadata information, which is then written to the LU cache of the array. At this point, the data associated with the volume to be moved begins to be transferred to the destination pool. During the move operation, bin migration is also executed in operation 1108.

As mentioned above with reference to FIG. 10B, the bin migration is a function that ensures that been identification corresponding to the location of data within the arrays is maintained accurate, so that later accesses of data by initiators will correctly identify the location of the data, without delay or error. In one embodiment, once the bin map has been completed from the move, the bin map is also written to LU cache. In operation 1110, the paths to the array in the destination pool are advertised to initiators, so as to enable access to the moved volume. In one embodiment, advertising refers the host being able to identify the paths to the volume after being moved, e.g., using the updated bin map that was written to LU cache. Furthermore, RTPG requests will be severed with currently data regarding paths to the volumes, as the LU cache is dynamically and periodically updated by GDD, as mentioned above. In this manner, volumes being accessed by initiators will not be lost or made inaccessible after a move operation has been completed. Further, the bin map used by the initiators will also identify the new location of the bins associated with the data that has been moved to the destination pool. This operation will also include dropping of paths that are no longer accurate or accessible, and updating the paths to the correct volumes. Once the volume has been moved, as mentioned, the destination pool contains the data and a process for maintaining consistency of port status can also be performed by GDD on a periodic basis. This ensures that all LU cache in a group maintain information about all port paths and ALUA status.

In still another embodiment, when arrays are added to a volume, the host needs to know the physical paths to each of the arrays, including new arrays. When a new path is available, the host needs to discover the new path to the data of the volume. One configuration defines a process for setting a BIT when a new array is added to a LUN (volume). This triggers the host to recheck the LUN catalog, so the host can re-discover the LUN map. When the host is processing IOs, the host will see the BIT, which will trigger re-discovery of the LUN map. In one embodiment, host software talks to the storage array, and can be used to cause a monitor of the Bin Map of an array. If a new array shows up in the bin map, e.g., A3 is added to A1 and A2, then A3 will show up in the Bin Map. When the host sees this it will trigger a LUN rescan of the paths to all of arrays A1-A3. Another way to force a host rescan is to force a FC logout or Registered State Changed Notification (RSCN), when the Bin Map changes. These changes happen during array adds to a pool and also when a pool move is processed. Thus, path discovery and rescans by a host can be triggered efficiently. By way of example, hosts can be notified or forced to be made aware of path changes, in an escalation process, to rediscover paths changes.

In one embodiment, after a volume is moved, one or more arrays of a group in which the volume resides can set a bit, process an instruction, set a command or trigger communication so that one or more of the hosts connected to the group are prompted to rediscover or rescan for paths to the volumes of the group, including the paths to the moved volume. By way of example, data can be set for reading by hosts, sent to hosts, notified to hosts, messaged to hosts, or exchanged to hosts to notify hosts that a rescan or rediscovery of paths should take place. In some embodiments, the operations to cause hosts to recognize new paths can be array driven. These actions are different from setting data, which requires a host to see the data to then cause a rescan or rediscovery of paths. As mentioned above, an array driven process to force hosts to recognize paths, e.g., which have changed, may include actions such as forcing FC logout or Registered State Change Notification (RSCN), etc.

As also noted above, the type of action taken to make hosts recognize new paths can be processed in an escalating manner, e.g., suggestive or passive data (e.g., that can be seen by host(s) to then take action) to more forceful or required actions (e.g., where an array instructs or requires certain action to take place by the host(s)). This ensures that hosts keep the most accurate and up to date inventory of paths to the volumes of the group of array.

Furthermore, as mentioned above, the process described herein also enables for the storage system to reply to initiators that issue RTPG requests, to identify the port connections and ALUA status of each port of the group. Thus, the embodiments described herein provide management functions for maintaining consistent LU cache associated with port information, enable management functions to move volumes, enable management functions for maintaining bin map is accurate in response to move operations, and maintaining accurate responses to initiators requesting access to one or more volumes of a storage array group.

Example Storage Array Infrastructure

Figure 12:
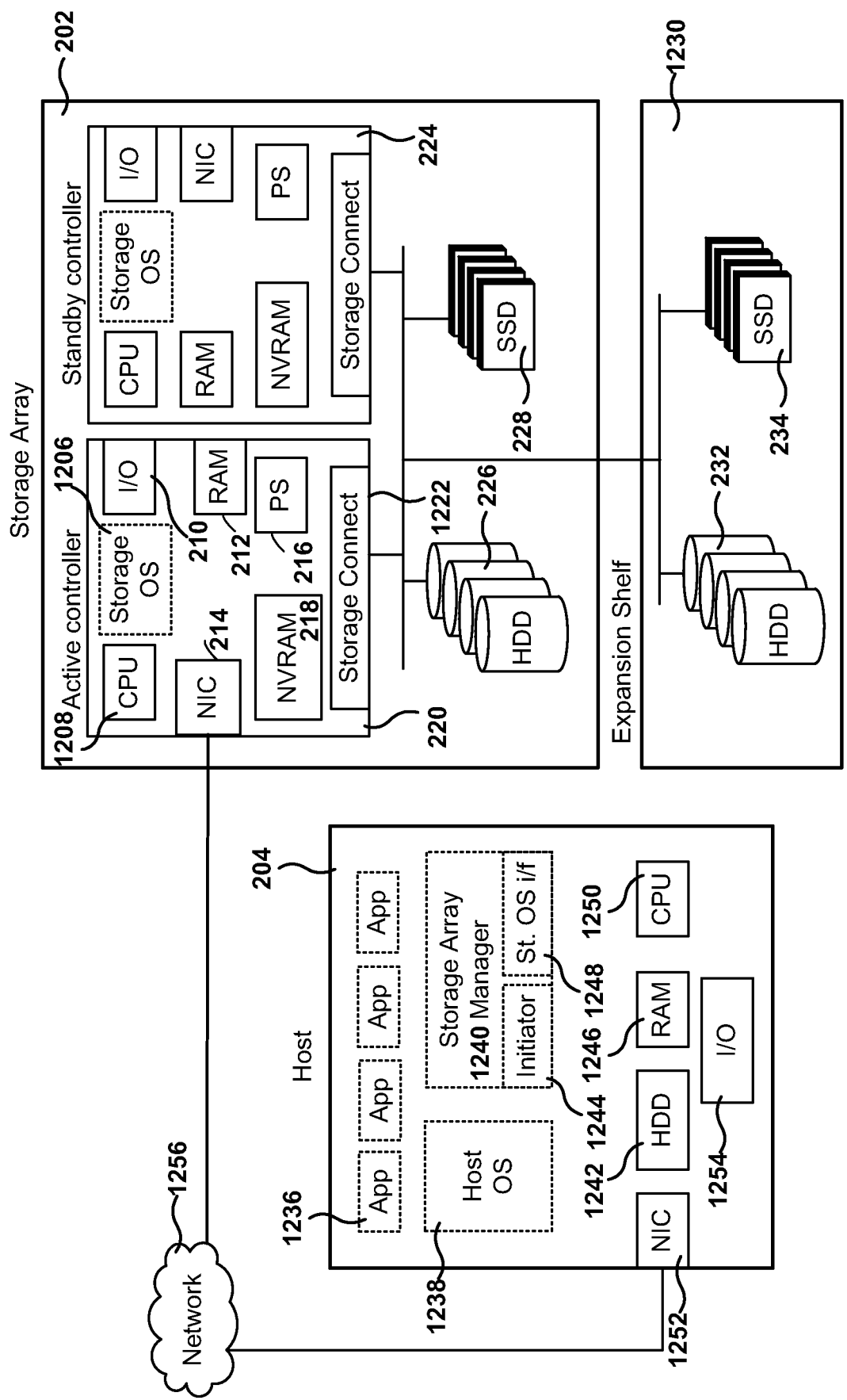
FIG. 12 illustrates an example architecture of a storage array, according to one embodiment.

FIG. 12 illustrates an example architecture of a storage array 202, according to one embodiment. In one embodiment, storage array 202 includes an active controller 220, a standby controller 224, one or more HDDs 226, and one or more SSDs 228. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 226, or to SSD 228, or to both.

In addition, the active controller 220 further includes CPU 1208, general-purpose RAM 212 (e.g., used by the programs executing in CPU 1208), input/output module 210 for communicating with external devices (e.g., USB port, terminal port, connectors, plugs, links, etc.), one or more network interface cards (NICs) 214 for exchanging data packages through network 1256, one or more power supplies 216, a temperature sensor (not shown), and a storage connect module 1222 for sending and receiving data to and from the HDD 226 and SSD 228. In one embodiment, the NICs 214 may be configured for Ethernet communication or Fibre Channel communication, depending on the hardware card used and the storage fabric. In other embodiments, the storage array 202 may be configured to operate using the iSCSI transport or the Fibre Channel transport.

Active controller 220 is configured to execute one or more computer programs stored in RAM 212. One of the computer programs is the storage operating system (OS) used to perform operating system functions for the active controller device. In some implementations, one or more expansion shelves 1230 may be coupled to storage array 202 to increase HDD 232 capacity, or SSD 234 capacity, or both.

Active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., IO requests) are sent over network 1256, and the storage array 202 stores the sent data or sends back the requested data to host 204.

Host 204 is a computing device including a CPU 1250, memory (RAM) 1246, permanent storage (HDD) 242, a NIC card 1252, and an IO module 1254. The host 204 includes one or more applications 1236 executing on CPU 1250, a host operating system 1238, and a computer program storage array manager 1240 that provides an interface for accessing storage array 202 to applications 1236. Storage array manager 1240 includes an initiator 1244 and a storage OS interface program 1248. When an IO operation is requested by one of the applications 1236, the initiator 1244 establishes a connection with storage array 202 in one of the supported formats (e.g., iSCSI, Fibre Channel, or any other protocol). The storage OS interface 1248 provides console capabilities for managing the storage array 202 by communicating with the active controller 220 and the storage OS 1206 executing therein. It should be understood, however, that specific implementations may utilize different modules, different protocols, different number of controllers, etc., while still being configured to execute or process operations taught and disclosed herein.

In some embodiments, a plurality of storage arrays may be used in data center configurations or non-data center configurations. A data center may include a plurality of servers, a plurality of storage arrays, and combinations of servers and other storage. It should be understood that the exact configuration of the types of servers and storage arrays incorporated into specific implementations, enterprises, data centers, small office environments, business environments, and personal environments, will vary depending on the performance and storage needs of the configuration.

In some embodiments, servers may be virtualized utilizing virtualization techniques, such that operating systems can be mounted on hypervisors to allow hardware and other resources to be shared by specific applications. In virtualized environments, storage is also accessed by virtual hosts that provide services to the various applications and provide data and store data to storage. In such configurations, the storage arrays can be configured to service specific types of applications, and the storage functions can be optimized for the type of data being serviced.

For example, a variety of cloud-based applications are configured to service specific types of information. Some information requires that storage access times are sufficiently fast to service mission-critical processing, while other types of applications are designed for longer-term storage, archiving, and more infrequent accesses. As such, a storage array can be configured and programmed for optimization that allows servicing of various types of applications. In some embodiments, certain applications are assigned to respective volumes in a storage array. Each volume can then be optimized for the type of data that it will service.

As described with reference to FIG. 12, the storage array 202 can include one or more controllers 220, 224. One controller serves as the active controller 220, while the other controller 224 functions as a backup controller (standby). For redundancy, if the active controller 220 were to fail, immediate transparent handoff of processing (i.e., fail-over) can be made to the standby controller 224. Each controller is therefore configured to access storage 1130, which in one embodiment includes hard disk drives (HDD) 226 and solid-state drives (SSD) 228. As mentioned above, SSDs 228 are utilized as a type of flash cache, which enables efficient reading of data stored to the storage 1130.

As used herein, SSDs functioning as "flash cache," should be understood to operate the SSD as a cache for block level data access, providing service to read operations instead of only reading from HDDs 226. Thus, if data is present in SSDs 228, reading will occur from the SSDs instead of requiring a read to the HDDs 226, which is a slower operation. As mentioned above, the storage operating system 1206 is configured with an algorithm that allows for intelligent writing of certain data to the SSDs 228 (e.g., cache-worthy data), and all data is written directly to the HDDs 226 from NVRAM 218.

The algorithm, in one embodiment, is configured to select cache-worthy data for writing to the SSDs 228, in a manner that provides an increased likelihood that a read operation will access data from SSDs 228. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 228 may be referred to as flash, or flash cache, or flash-based memory cache, or flash drives, storage flash, or simply cache. Consistent with the use of these terms, in the context of storage array 102, the various implementations of SSD 228 provide block level caching to storage, as opposed to instruction level caching. As mentioned above, one functionality enabled by algorithms of the storage OS 1206 is to provide storage of cache-worthy block level data to the SSDs, so that subsequent read operations are optimized (i.e., reads that are likely to hit the flash cache will be stored to SSDs 228, as a form of storage caching, to accelerate the performance of the storage array 102).

In one embodiment, it should be understood that the "block level processing" of SSDs 228, serving as storage cache, is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 228 is implemented by algorithms exercised by the storage OS 1206, which can differentiate between the types of blocks being processed for each type of application or applications. That is, block data being written to storage 1230 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 1206, for efficient use of flash cache 228.

Continuing with the example of FIG. 12, that active controller 220 is shown including various components that enable efficient processing of storage block reads and writes. As mentioned above, the controller may include an input output (TO) 210, which can enable one or more machines to access functionality of the storage array 202. This access can provide direct access to the storage array, instead of accessing the storage array over a network. Direct access to the storage array is, in some embodiments, utilized to run diagnostics, implement settings, implement storage updates, change software configurations, and/or combinations thereof. As shown, the CPU 1208 is communicating with storage OS 1206.

For more information regarding storage systems, functions, features, operations, scale-out configurations, all flash arrays, hybrid arrays, and/or system components, reference may be made to U.S. patent application Ser. No. 14/748,179, filed on Jun. 23, 2015, which claims priority to U.S. Provisional Patent Application No. 62/058,015, filed on Sep. 30, 2014. Each of these applications is incorporated herein by references for all purposes.

It should be apparent, that the present embodiments may be practiced without some or all of these specific details. Modification to the modules, code and communication interfaces are also possible, so long as the defined functionality for the storage array or modules of the storage array is maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A method for path discovery to ports of a Fibre Channel storage system that includes a multi-array pool, the multi-array pool being part of a group of arrays, the method comprising:
    executing, by a group leader array of the group of arrays, a pull operation to gather a port status of each one of the arrays in the group of arrays, the group leader array being an array of the group of arrays designated to execute management functions for the group of arrays;
    executing, by the group leader array of the group of arrays, a push operation to populate a local cache of each array in the group of arrays with the port status of each one of the arrays in the group of arrays; and
    executing the pull operation and the push operation on a periodic schedule to push changes occurring at particular ones of the arrays of the group of arrays to each one of the arrays in the group of arrays.

2. The method of claim 1, wherein the port status of an array includes ALUA settings of each port of the array, wherein a setting of active optimized (AO) and standby (SB) are determined for each port of the arrays in the group of arrays from the ALUA settings.

3. The method of claim 1, wherein the periodic schedule is programmable and defined by a time-out window that continually cycles.

4. The method of claim 1, wherein the local cache is a logical unit cache (LUC) that stores logical unit number (LUN) mappings and port data, and is local to each of an active controller and a standby controller of each array in the group of arrays.

5. The method of claim 1, further comprising,
    striping a volume across at least two arrays of the multi-array pool;

maintaining a bin map that identifies data of the volume stored in each of the at least two arrays; and defining at least two paths to the volume using the port status that identifies ports in active optimized (AO) ports and the bin map.

6. The method of claim 1, further comprising, identifying a volume in the multi-array pool;

executing a move operation of the volume to another multi-array pool of the group of arrays;

transferring the local cache of one array of the multi-array pool to the local cache of the group of arrays of the other multi-array pool, the multi-array pool being a source pool and the other multi-array pool being a destination pool; and executing a bin migration associated with a bin map that identifies what data of the volume is stored in each array in the group of arrays.

7. The method of claim 6, wherein the local cache is a logical unit cache (LUC) that stores logical unit number (LUN) mappings and port data, and is local to each of an active controller and a standby controller of each array in the group of arrays.

8. The method of claim 6, wherein after execution of the move operation of the volume is complete, the bin map is updated consistent with a location of data in the array or arrays of the destination pool.

9. The method of claim 8, wherein after execution of the move operation of the volume is complete, paths to the volume in the source pool are removed and paths to the volume in the destination pool are added, the method further comprising, setting data or triggering action from the arrays to cause one or more hosts connected to the group of arrays to rediscover paths to the volume.

10. The method of claim 1, further comprising, adding an array to the group of arrays, the added array being associated to the multi-array pool or associated to a new pool of the group of arrays, the added array providing for a scale-out of the group of arrays.

11. A method for processing a volume move from a source pool to a destination pool of a group of arrays in a Fibre Channel storage system, the method comprising:

identifying, by a central processing unit (CPU), a volume to be moved;

transferring, by the CPU, a local cache of one array in the source pool to a local cache of an array of the destination pool, the local cache transferred to the array of the destination pool including metadata that is descriptive of the volume to be moved;

initiating, by the CPU, a transfer of data for the volume from the array in the source pool to the array of the destination pool;

executing, by the CPU, a bin migration process to update a bin map while the transfer of data is in progress, wherein when the transfer of data is complete the bin map identifies a location of the data in the destination pool; and updating, by the CPU, one or more paths to the volume based on port statuses of ports of the arrays in the group of arrays, wherein the port statuses are maintained by:

executing, by a group leader array of the group of arrays, a push operation to cause a local cache of each array in the group of arrays to be populated with the port statuses of each one of the arrays in the group of arrays, the group leader array being an array of the group of arrays designated to execute management functions for the group of arrays.

12. The method of claim 11, further comprising:

executing, by the group leader array of the group of arrays, a pull operation to cause the group leader array to gather the port status of each one of the arrays in the group of arrays; and executing the pull operation and the push operation on a periodic schedule to push changes occurring at particular ones of the arrays of the group of arrays to each one of the arrays in the group of arrays.

13. The method of claim 11, wherein the local cache is a logical unit cache (LUC) that stores the metadata, logical unit number (LUN) mappings and port data, and is local to each of an active controller and a standby controller of each array in the group of arrays.

14. The method of claim 12, wherein the port status includes ALUA settings of each port of each array, such that a setting of active optimized (AO) and standby (SB) are determined for each port of the arrays in the group of arrays.

15. The method of claim 12, wherein the periodic schedule is programmable and defined by a time-out window that continually cycles.

16. The method of claim 12, further comprising, striping the volume across at least two arrays of a pool of the group of arrays;

maintaining a bin map that identifies data of the volume stored in each of the at least two arrays; and defining at least two paths to the volume using the port status that identifies ports in active optimized (AO) ports and the bin map.

17. The method of claim 11, wherein updating the one or more paths to the volume includes setting data for hosts or triggering action from the arrays to cause one or more hosts connected to the group of arrays to rediscover paths to the volume.

18. A storage array arrangement comprising:

a group of arrays, wherein the arrays in the group of arrays each has an active controller and a standby controller, wherein a volume move process is executed by a group leader array of the group of arrays to move the volume from a source pool to a destination pool of the group of arrays, the group leader array being an array of the group of arrays designated to execute management functions for the group of arrays and including:

logic for transferring a local cache of one array in the source pool to a local cache of an array of the destination pool, the local cache transferred to the array of the destination pool including metadata that is descriptive of the volume to be moved;

logic for initiating a transfer of data for the volume from the array in the source pool to the array of the destination pool;

logic for executing a bin migration process to update a bin map while the transfer of data is in progress, such that when the transfer of data is complete the bin map identifies a location of the data in the destination pool;

logic for updating one or more paths to the volume based on port status of ports of the arrays in the group of arrays; and logic for executing a push operation to cause a local cache of each array in the group of arrays to be populated with the port statuses of each one of the arrays in the group of arrays.

19. The storage array arrangement of claim 18, wherein the port status is maintained current by managing a process by the group leader array that includes, logic to execute, by the group leader array of the group of arrays to gather port status of each one of the arrays in the group of arrays; and logic to execute the pull operation and the push operation on a periodic schedule, such that changes occurring at particular ones of the arrays of the group of arrays is pushed to each one of the arrays in the group of arrays.

20. The storage array arrangement of claim 18, wherein the local cache is a logical unit cache (LUC) that stores the metadata, logical unit number (LUN) mappings and port data, and is local to each of an active controller and a standby controller of each array in the group of arrays.

21. The storage array arrangement of claim 18, wherein the port status includes ALUA settings of each port of each array, such that a setting of active optimized (AO) and standby (SB) are determined for each port of the arrays in the group of arrays.

22. The storage array arrangement of claim 19, wherein the periodic schedule is programmable and defined by a time-out window that continually cycles.

23. The storage array arrangement of claim 20, further comprising, logic for striping the volume across at least two arrays of a pool of the group of arrays;

logic for maintaining current a bin map that identifies data of the volume stored in each of the at least two arrays; and logic for defining at least two paths to the volume using the port status that identifies ports in active optimized (AO) ports and the bin map.

24. The storage array arrangement of claim 18, wherein the logic for updating the one or more paths to the volume includes logic for setting data for hosts or triggering action from the arrays to cause one or more hosts connected to the group of arrays to rediscover paths to the volume.

25. A non-transitory computer readable medium having stored thereon instructions that when executed by a processor, cause the processor to:

identify a volume to be moved from a source pool to a destination pool of a group of arrays in a Fibre Channel storage system;

transfer a local cache of one array in the source pool to a local cache of an array of the destination pool, the local cache transferred to the array of the destination pool including metadata that is descriptive of the volume to be moved;

initiate a transfer of data for the volume from the array in the source pool to the array of the destination pool;

execute a bin migration process to update a bin map while the transfer of data is in progress, wherein when the transfer of data is complete the bin map identifies a location of the data in the destination pool;

update one or more paths to the volume based on port statuses of ports of the arrays in the group of arrays; and execute, by a group leader array of the group of arrays, a push operation to cause a local cache of each array in the group of arrays to be populated with the port statuses of each one of the arrays in the group of arrays, the group leader array being an array of the group of arrays designated to execute management functions for the group of arrays.

26. The non-transitory computer readable medium of claim 25, wherein the port status is maintained in a current state by managing a process that includes instructions that are to cause the processor to:

execute, by the group leader, a pull operation to gather a port status of each one of the arrays in the group of arrays; and execute the pull operation and the push operation on a periodic schedule to push changes occurring at particular ones of the arrays of the group of arrays to each one of the arrays in the group of arrays.

27. The non-transitory computer readable medium of claim 25, wherein the instructions for updating the one or more paths to the volume includes instructions that are to cause the processor to set data for hosts or triggering action from the arrays to cause one or more hosts connected to the group of arrays to rediscover paths to the volume.

* * * * *